United States Patent
Hughey

[11] Patent Number: 6,144,570
[45] Date of Patent: *Nov. 7, 2000

[54] CONTROL SYSTEM FOR A HVDC POWER SUPPLY

[75] Inventor: Daniel C. Hughey, Indianapolis, Ind.

[73] Assignee: Illinois Tool Works Inc., Glenview, Ill.

[*] Notice: This patent is subject to a terminal disclaimer.

[21] Appl. No.: 09/338,206

[22] Filed: Jun. 22, 1999

Related U.S. Application Data

[63] Continuation-in-part of application No. 08/953,858, Oct. 16, 1997, Pat. No. 5,978,244.
[60] Provisional application No. 60/102,584, Sep. 30, 1998.

[51] Int. Cl.[7] .................................................. H02M 7/538
[52] U.S. Cl. ............................................. 363/97; 363/26
[58] Field of Search .................................. 363/17, 24, 25, 363/260, 61, 95, 97, 98

[56] References Cited

U.S. PATENT DOCUMENTS

| | | |
|---|---|---|
| 2,767,359 | 10/1956 | Larsen et al. . |
| 3,273,015 | 9/1966 | Fischer . |
| 3,627,661 | 12/1971 | Gordon et al. . |
| 3,641,971 | 2/1972 | Walberg . |
| 3,731,145 | 5/1973 | Senay . |
| 3,764,883 | 10/1973 | Staad et al. . |
| 3,795,839 | 3/1974 | Walberg . |
| 3,809,955 | 5/1974 | Parson . |
| 3,851,618 | 12/1974 | Bentley . |
| 3,872,370 | 3/1975 | Regnault . |
| 3,875,892 | 4/1975 | Gregg et al. . |
| 3,893,006 | 7/1975 | Algeri et al. . |
| 3,894,272 | 7/1975 | Bentley . |
| 3,895,262 | 7/1975 | Ribnitz . |
| 3,970,920 | 7/1976 | Braun . |
| 4,000,443 | 12/1976 | Lever . |
| 4,038,593 | 7/1977 | Quinn . |
| 4,073,002 | 2/1978 | Sickles et al. . |
| 4,075,677 | 2/1978 | Bentley . |

(List continued on next page.)

FOREIGN PATENT DOCUMENTS

| | | |
|---|---|---|
| 0 160 179 A2 | 11/1985 | European Pat. Off. . |
| 24 36 142 | 2/1975 | Germany . |
| 32 15 644 A1 | 10/1983 | Germany . |
| 2 077 006 | 12/1981 | United Kingdom . |

OTHER PUBLICATIONS

Rans–Pak 1000™ Power Supply brochure, May, 1990, 2 pages.

Rans–Pak 1000™ Power Supply service manual, 1991, 25 pages.

(List continued on next page.)

*Primary Examiner*—Jeffrey Sterrett
*Attorney, Agent, or Firm*—Barnes & Thornburg

[57] ABSTRACT

A high magnitude potential supply comprises a first circuit (220, 224) for generating a first signal related to an output high magnitude potential (KV) across a pair of output terminals (113 and ground) of the supply, a second circuit (210, 218) for generating a second signal related to a desired output current from the high magnitude potential supply, and a third circuit (Q2B, Q2C, Q7 and associated components) for supplying an operating potential (VCT) to the high magnitude potential supply so that it can produce the high magnitude operating potential. The third circuit has a control terminal (COMP terminal of 86). The supply further comprises a fourth circuit (86) coupled to the first (220, 224) and second (210, 218) circuits and to the control terminal (COMP terminal of 86). The fourth circuit (86) receives the first and second signals from the first (220, 224) and second (210, 218) circuits and controls the operating potential supplied to the high magnitude potential supply by the third circuit (Q2B, Q2C, Q7 and associated components). The supply further comprises a fifth circuit (84, 240, 242, 244) for disabling the supply of operating potential to the high magnitude potential supply so that no high magnitude operating potential can be supplied by it. The fifth circuit (84, 240, 242, 244) is also coupled to the control terminal (COMP terminal of 86).

23 Claims, 22 Drawing Sheets

U.S. PATENT DOCUMENTS

| | | |
|---|---|---|
| 4,182,490 | 1/1980 | Kennon . |
| 4,187,527 | 2/1980 | Bentley . |
| 4,196,465 | 4/1980 | Buschor . |
| 4,266,262 | 5/1981 | Haase, Jr. . |
| 4,287,552 | 9/1981 | Wagner et al. . |
| 4,323,947 | 4/1982 | Huber . |
| 4,324,812 | 4/1982 | Bentley . |
| 4,343,828 | 8/1982 | Smead et al. . |
| 4,353,970 | 10/1982 | Dryczynski et al. . |
| 4,377,838 | 3/1983 | Levey et al. . |
| 4,385,340 | 5/1983 | Kuroshima . |
| 4,402,030 | 8/1983 | Moser et al. . |
| 4,409,635 | 10/1983 | Kraus . |
| 4,472,781 | 9/1984 | Miller . |
| 4,481,557 | 11/1984 | Woodruff . |
| 4,485,427 | 11/1984 | Woodruff et al. . |
| 4,508,276 | 4/1985 | Malcolm . |
| 4,538,231 | 8/1985 | Abe et al. . |
| 4,587,605 | 5/1986 | Kouyama et al. . |
| 4,630,220 | 12/1986 | Peckinpaugh . |
| 4,651,264 | 3/1987 | Hu . |
| 4,672,500 | 6/1987 | Roger et al. . |
| 4,674,003 | 6/1987 | Zylka . |
| 4,698,517 | 10/1987 | Tohya et al. . |
| 4,710,849 | 12/1987 | Norris . |
| 4,737,887 | 4/1988 | Thome . |
| 4,745,520 | 5/1988 | Hughey . |
| 4,764,393 | 8/1988 | Henger et al. . |
| 4,797,833 | 1/1989 | El-Amawy et al. . |
| 4,809,127 | 2/1989 | Steinman et al. . |
| 4,825,028 | 4/1989 | Smith . |
| 4,841,425 | 6/1989 | Maeba et al. . |
| 4,890,190 | 12/1989 | Hemming . |
| 4,891,743 | 1/1990 | May et al. . |
| 4,912,588 | 3/1990 | Thome et al. . |
| 4,916,571 | 4/1990 | Staheli . |
| 4,920,246 | 4/1990 | Aoki . |
| 5,012,058 | 4/1991 | Smith . |
| 5,019,996 | 5/1991 | Lee . |
| 5,056,720 | 10/1991 | Crum et al. . |
| 5,063,350 | 11/1991 | Hemming et al. . |
| 5,067,434 | 11/1991 | Thur et al. . |
| 5,080,289 | 1/1992 | Lunzer . |
| 5,093,625 | 3/1992 | Lunzer . |
| 5,107,438 | 4/1992 | Sato . |
| 5,121,884 | 6/1992 | Noakes . |
| 5,124,905 | 6/1992 | Kniepkamp . |
| 5,138,513 | 8/1992 | Weinstein . |
| 5,159,544 | 10/1992 | Hughey et al. . |
| 5,267,138 | 11/1993 | Shores . |
| 5,340,289 | 8/1994 | Konieczynski et al. . |
| 5,351,903 | 10/1994 | Mazakas et al. . |
| 5,433,387 | 7/1995 | Howe et al. . |
| 5,457,621 | 10/1995 | Munday et al. . |
| 5,566,042 | 10/1996 | Perkins et al. . |
| 5,666,279 | 9/1997 | Takehara et al. . |
| 5,745,358 | 4/1998 | Faulk . |
| 5,818,709 | 10/1998 | Takehara . |
| 5,939,993 | 8/1999 | Burrtin et al. . |
| 5,947,377 | 9/1999 | Hansinger et al. . |
| 5,978,244 | 11/1999 | Hughey . |

OTHER PUBLICATIONS

Rans–Pak 1000™ Power Supply brochure, May, 1988, 1 page.

Rans–Pak 300™ Power Supply brochure, Sep., 1990, 2 pages.

Ransburg GEMA Series 400 Power Supply Panel Service Manual, Apr., 1990, 59 pages.

Kazkaz, Electric Field and Space Charge of Spherical Electrode at High Voltage Concentric with a Spherical Grounded Conductive Target: Proc. at the 1996 Industry Applications Society $31^{st}$ Annual Mtg., San Diego, CA, 1904–1911 (Oct. 1996).

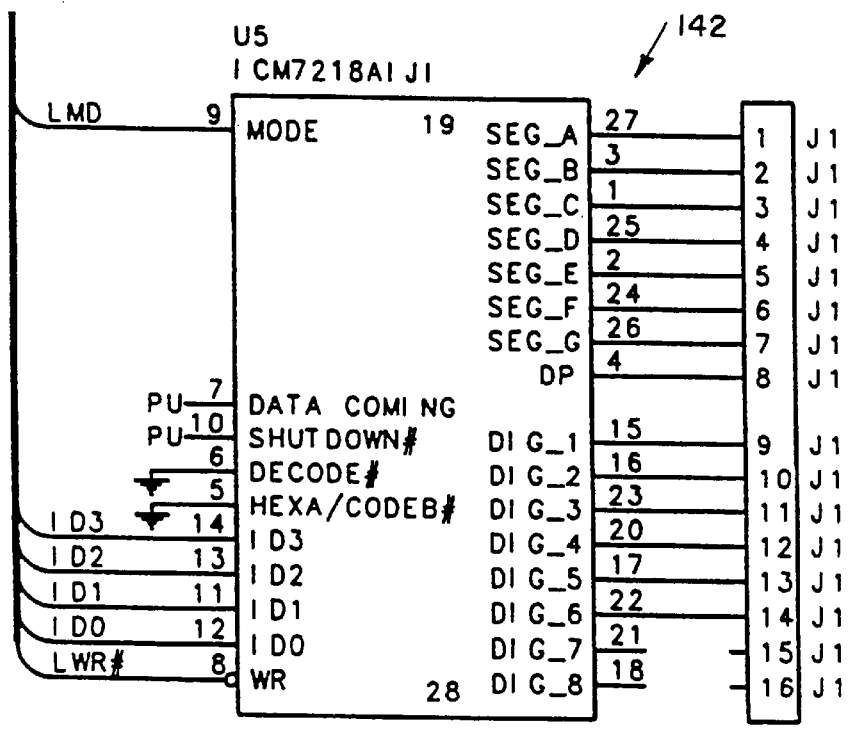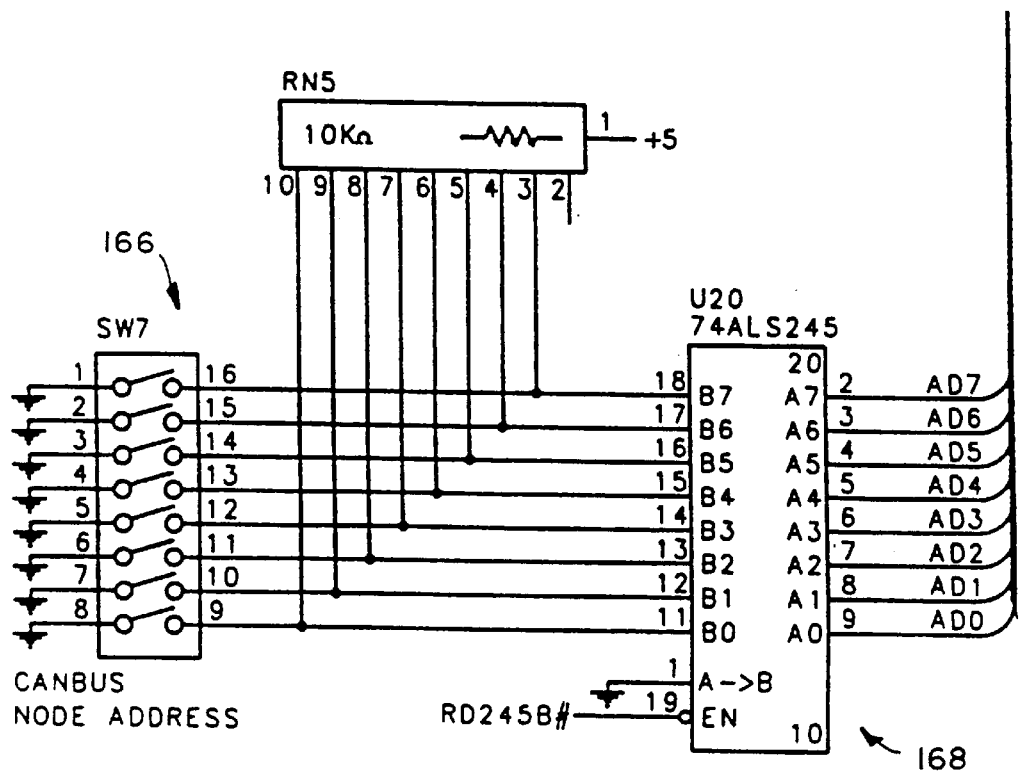
FIG. 5e

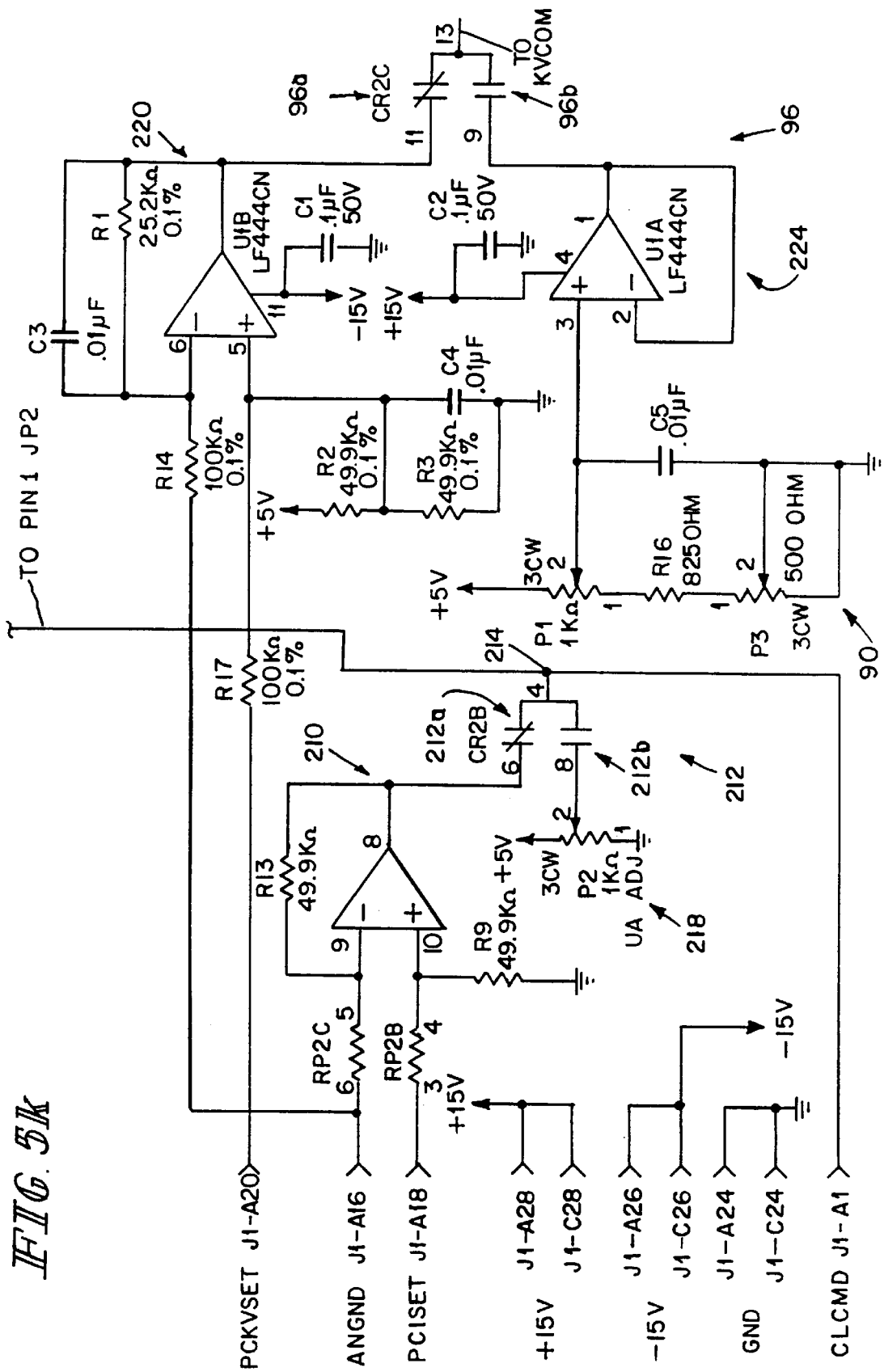

CONTROL SYSTEM FOR A HVDC POWER SUPPLY

CROSS-REFERENCE TO RELATED APPLICATIONS

This application is a CIP of Ser. No. 08/953,858 filed Oct. 16, 1997 now U.S. Pat. No. 5,978,244, assigned to the same assignee as this application. That application is incorporated herein by reference. This application claims benefit of provisional appln 60/102,584 Sep. 30, 1998.

FIELD OF THE INVENTION

This invention relates to coating of articles. It is disclosed in the context of electrostatically aided coating of articles with pulverulent coating materials. However it is believed to be useful in other applications as well.

BACKGROUND OF THE INVENTION

The electrostatically aided atomization and coating of articles with coating materials such as atomized liquid droplets and pulverulent coating resins, or powders, is well known. There are, for example, the systems and methods illustrated and described in U.S. Pat. Nos. 3,851,618; 3,875,892; 3,894,272; 4,075,677; 4,187,527; 4,324,812; 4,481,557; 4,485,427; 4,745,520; and, 5,159,544, to identify but a few. This listing is not intended as a representation, nor should any such representation be inferred, that a complete search of all relevant art has been conducted or that no better art references than those listed here are available.

Most systems and methods for the charging and application of coating materials by electrostatically aided atomization and coating, and the control of such systems, are designed with the underlying assumption that the coating material being dispensed behaves, to a first approximation, in a resistive manner. For example, the power supplies which provide the potentials from which the coating materials are charged are designed to charge and dispense materials which are electrically charged, but from which the charge migrates moderately quickly through the coating film being deposited on the article toward the grounded article itself. The resistance may be relatively low, as in the case of, for example, water base coating liquids, or relatively high, as in the case of colored coating resins, but the materials do behave in a basically resistive manner. These assumptions concerning the nature of these various coating materials have resulted in the design of the coating material charging power supplies with certain characteristics, such as, for example, relatively constant output voltage.

At some point, however, on the scale of resistivity of these coating materials, applicants have discovered that coating materials cross over from being resistive to a first approximation to being dielectric or capacitive to a first approximation. This phenomenon occurs at least by the time one considers the resistivities and other electrical parameters of some clear powder coatings. There is presently interest in the electrostatically aided application of such powder coatings in the manufacture of automotive vehicles. It has been determined that the unfused coatings can experience back ionization or back emissions from the article to which coating is being applied, resulting in the creation of imperfections, such as "starring" or pinholes and the like, in the applied coating. In many cases, these imperfections are not cured by passage of the coating through, for example, an infrared fusing oven. Consequently, the imperfections remain in the fused coating as, for example, sites where oxidation of the underlying surface of the article can occur. The automotive finish applicator must have a class A quality finish on the clear topcoat layer of an automotive finish. This layer generally must be substantially perfect when it is applied. It is more difficult to repair defects in the topcoat than, for example, the primer coat. Back ionization, if it is permitted to occur, generally causes heavy "orange peel" on a powder coated article after the powder coating is cured.

One explanation for this phenomenon is that the electric charges imparted to the particles of coating material as they are dispensed toward the target are not mobile on the surfaces of the coating material particles because of the relatively higher resistivities of the resins from which clear powder coatings are made. As a result, electrical charge does not migrate from newly deposited particles through underlying, previously deposited particles toward the surface of the article to be coated. Substantially the full charge remains on the deposited particles. Some results of this accumulation of charge are: that the deposited particles basically repel each other; that dispensed particles that have not yet reached the article to be coated are repelled by the relatively static electrical charge previously built up on the surface of it along with the previously applied resin powder; and, that the deposited particles are attracted toward other grounded targets, including exposed, grounded parts of the dispensing equipment. Additionally, free ions that are created by the charging mechanism of the powder applicator cannot migrate through the dry powder film very quickly due to the dielectric properties of clearcoat powders. As a result, electric fields in the range of, for example, $3 \times 10^6$ volts/meter are produced between the outer layer of the dry powder film and the grounded article being coated by the powder. When such fields accumulate, electrical arcing occurs through the deposited powder coating. This arcing results in surface defects. By controlling the formation of these free ions with a constant current power supply, these surface defects can be greatly reduced. Whatever the actual cause(s) of the phenomenon, the upshot of it is that power supplies which were designed based upon the assumption that coating materials were to a first approximation primarily resistive in nature are less than ideal power supplies for charging and applying coating materials which appear not to be primarily resistive in nature.

DISCLOSURE OF THE INVENTION

A high magnitude potential supply comprises a first circuit for generating a first signal related to an output high magnitude potential across a pair of output terminals of the supply, a second circuit for generating a second signal related to a desired output current from the high magnitude potential supply, and a third circuit for supplying an operating potential to the high magnitude potential supply so that it can produce the high magnitude operating potential. The third circuit has a control terminal. The supply further comprises a fourth circuit coupled to the first and second circuits and to the control terminal. The fourth circuit receives the first and second signals from the first and second circuits and controlling the operating potential supplied to the high magnitude potential supply by the third circuit. The supply further comprises a fifth circuit for disabling the supply of operating potential to the high magnitude potential supply so that no high magnitude operating potential can be supplied by it. The fifth circuit is also coupled to the control terminal.

Illustratively according to the invention, the circuit for generating a first signal related to an output high magnitude potential across a pair of output terminals of the supply comprises a programmable logic controller (PLC), and a high speed bus for coupling the PLC to the fourth circuit.

Further illustratively according to the invention, the circuit for generating a first signal related to an output high magnitude potential across a pair of output terminals of the supply comprises a first potentiometer for selecting a desired output high magnitude potential, and a conductor for coupling the first potentiometer to the fourth circuit.

Additionally illustratively according to the invention, the high magnitude potential supply further comprises a switch for selectively coupling one of the PLC and the first potentiometer to the fourth circuit.

Illustratively according to the invention, the circuit for generating a second signal related to a desired output current from the high magnitude potential supply comprises a programmable logic controller (PLC), and a high speed bus for coupling the PLC to the fourth circuit.

Further illustratively according to the invention, the circuit for generating a second signal related to a desired output current from the high magnitude potential supply comprises a second potentiometer for selecting a desired output current, and a conductor for coupling the second potentiometer to the fourth circuit.

Additionally illustratively according to the invention, the high magnitude potential supply further comprises a second switch for selectively coupling one of the PLC and the second potentiometer to the fourth circuit.

Illustratively according to the invention, the third circuit comprises a high magnitude potential transformer having a primary winding and a secondary winding. The primary winding has a center tap and two end terminals. Third and fourth switches are coupled to respective ones of the end terminals. A source provides oppositely phased third and fourth signals which control the third and fourth switches, respectively.

Further illustratively according to the invention, the fourth circuit comprises a switching regulator having an input terminal forming a summing junction for the first signal and the second signal and an output terminal coupled to the center tap. The fifth circuit includes a microprocessor ($\mu$P) and a fifth switch coupled to the $\mu$P to receive a fifth signal from the $\mu$P. The fifth switch is coupled to the summing junction to couple the fifth signal to the switching regulator to disable the supply of operating potential to the center tap.

Additionally illustratively according to the invention, the fifth switch is coupled to the summing junction through a filter which smooths the switching signals generated by the fifth switch in response to the $\mu$P's control.

Illustratively according to the invention, the high magnitude potential supply further comprises a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential. The $\mu$P indicates a fault if the operating potential is not being supplied to the high magnitude potential supply and the high magnitude potential supply is indicating that it is generating high magnitude potential.

Further illustratively according to the invention, the $\mu$P indicates a fault if the operating potential is being supplied to the high magnitude potential supply and the high magnitude potential supply is indicating that it is not generating high magnitude potential.

Additionally illustratively according to the invention, a coating system includes the high magnitude potential supply, a supply of coating material and a device for dispensing the coating material. The coating material dispensing device is coupled to the supply of coating material and to the high magnitude potential supply to charge the coating material dispensed by the coating material dispensing device.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
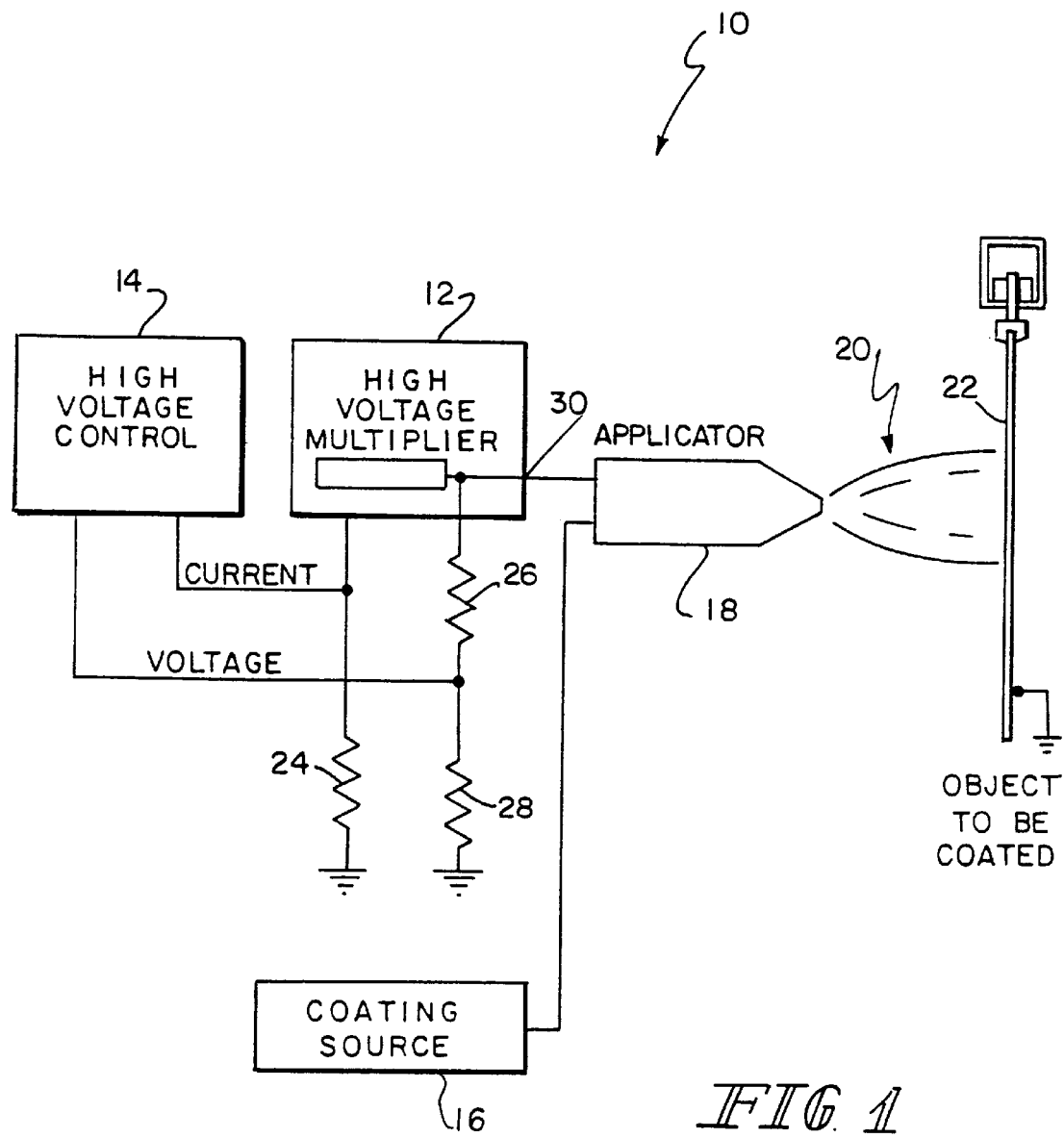
FIG. 1 illustrates a partly block and partly schematic diagram of a coating material charging and application system incorporating the present invention.
Figure 2:
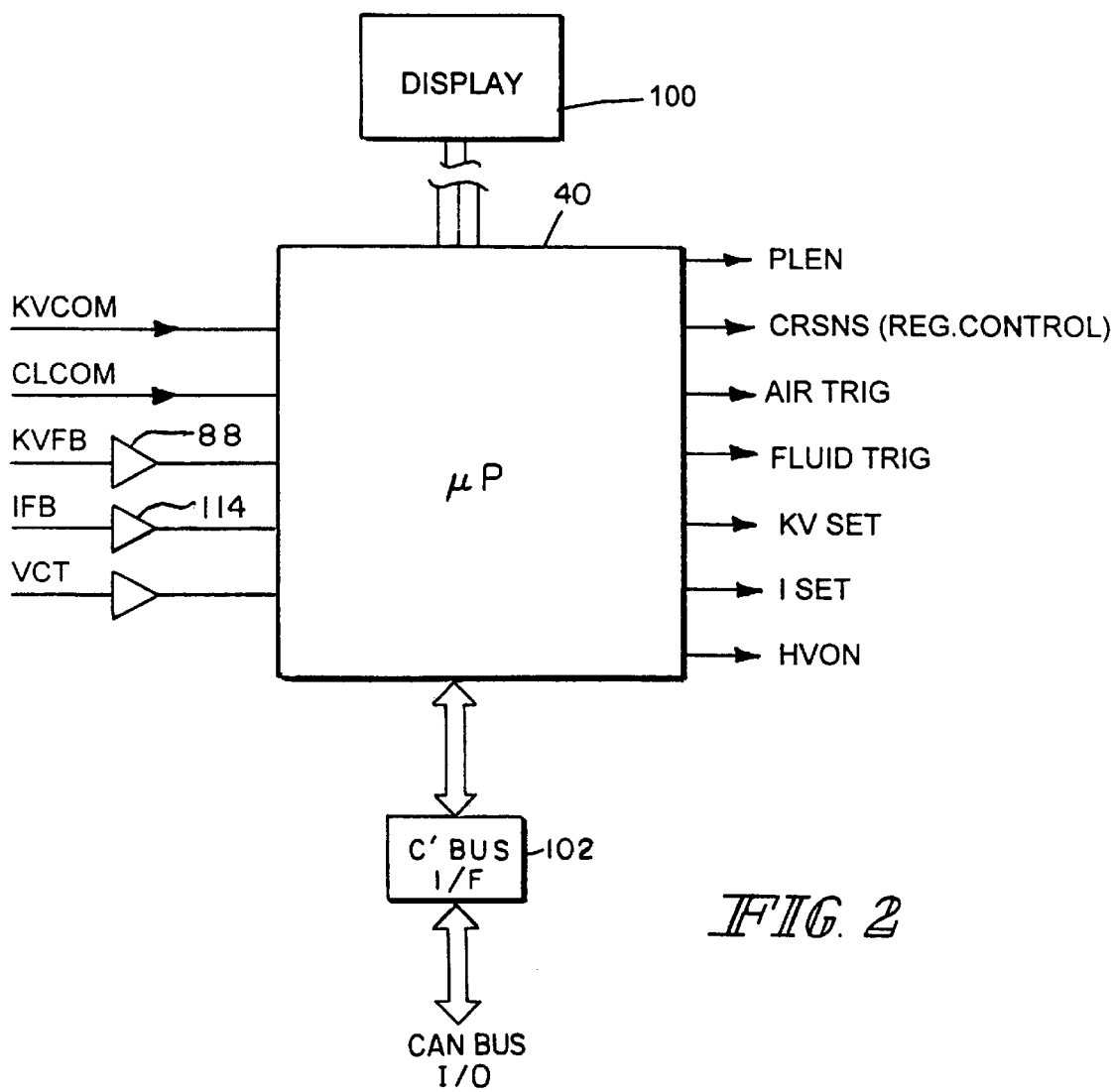
FIGS. 2–4 illustrate somewhat more detailed partly block and partly schematic diagrams of the system illustrated in FIG. 1.
Figure 3:
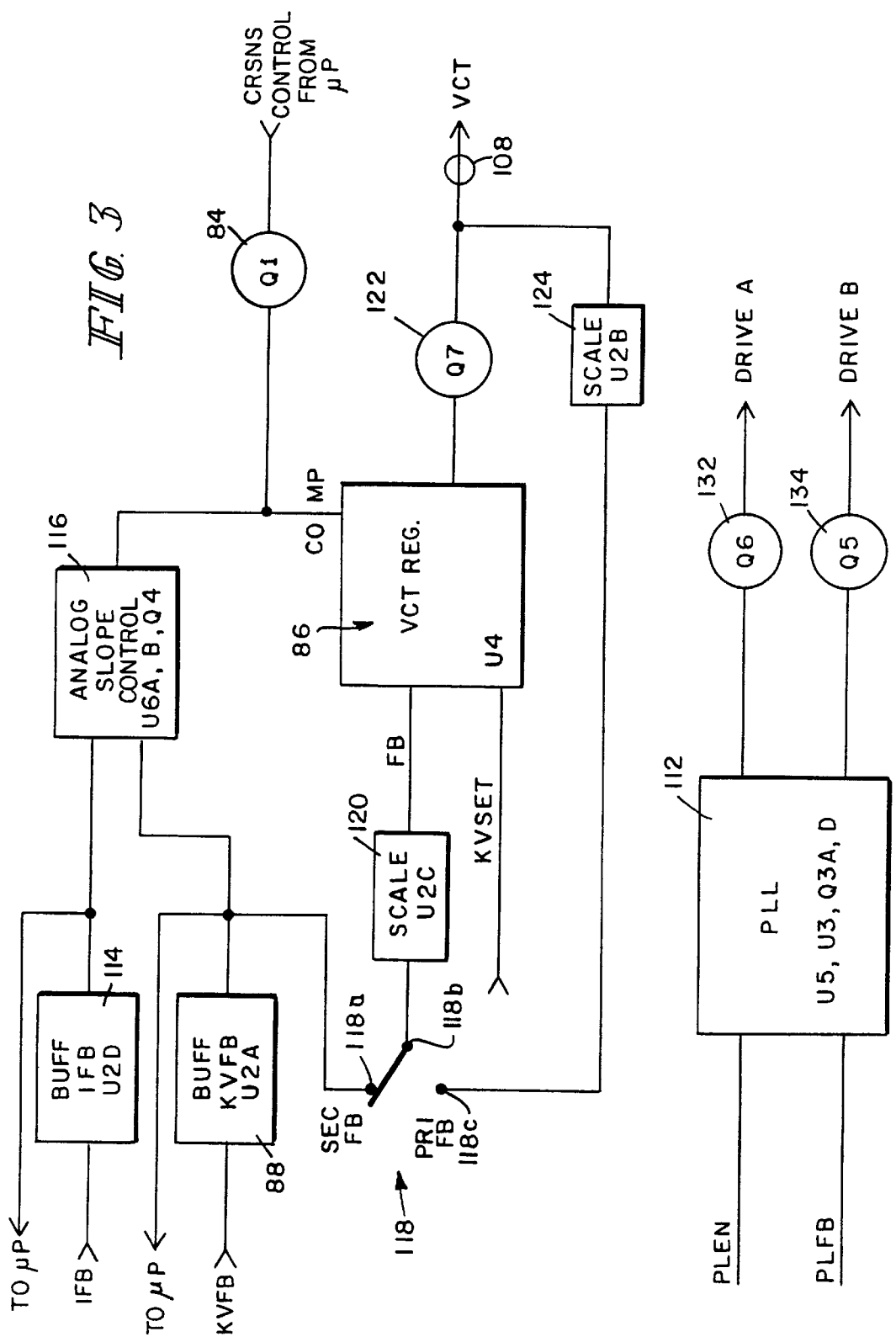
Figure 4:
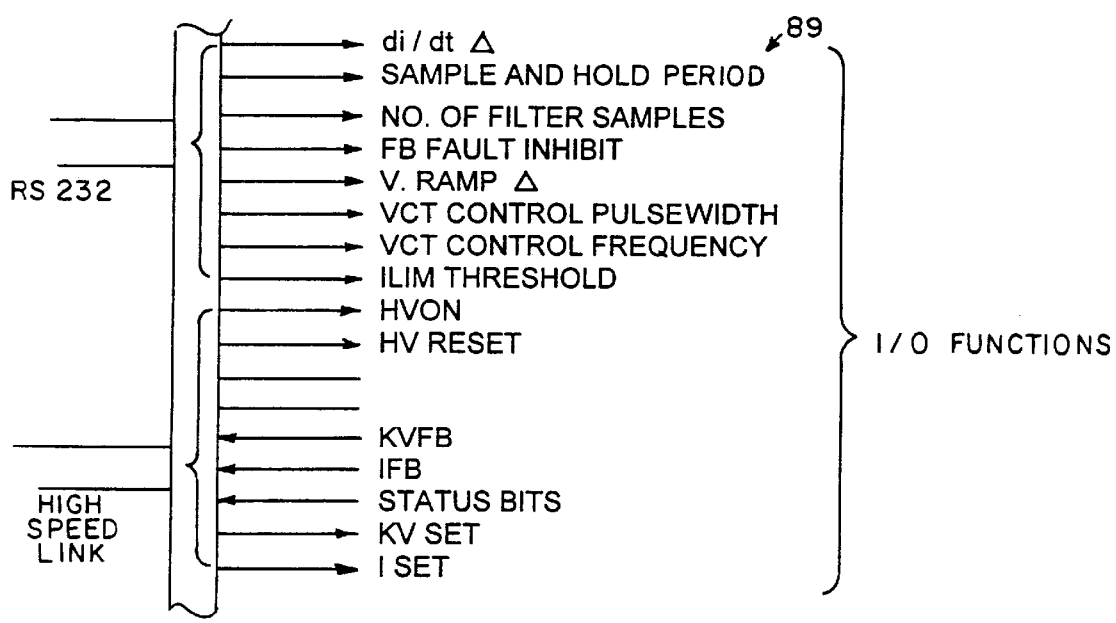

Referring now to FIG. 1, a system 10 for charging coating material, such as a white or clear pulverulent coating material, comprises a high magnitude electrostatic potential supply 12 and an associated controller 14 for the supply 12. A source 16, such as a fluidized bed, supplies the coating material to a dispenser 18 from which electrostatically charged coating material is dispensed in a cloud 20 toward an article 22 to be coated by the dispensed coating material. Illustrative pulverulent coating materials include, for example, Seibert ERC-1000P Automotive Clear, and PPG Automotive Clear Unclassified PCC 10120, revision 5/21/97 000 0807.

The article 22 is typically coupled to ground or some other low magnitude voltage, for example, by being conveyed past the dispenser 18 on a grounded conveyor, so that the highly charged coating material particles are attracted toward it in a well known manner. This charging thus results in an increased transfer efficiency of the charged coating material to the article than would be the case without electrostatic charging. The current returning from the article 22 to the supply 12 flows through a resistor 24 which thus senses the current flow, and thereby the coating material flow, from the dispenser 18 to the article 22. The voltage developed across resistor 24 by this current flow is an input to the controller 14. The output high magnitude potential itself is also sensed by a voltage divider including resistors 26 and 28. Ordinarily the value of resistor 26 will be several, for example, five to six, orders of magnitude higher than the value of resistor 28, and both resistors 26 and 28 will have relatively high values so as not to load the output terminal 30 of supply 12.

In accordance with the invention, controller 14 controls supply 12 so that the potential across resistor 24, which is related to the output current through terminal 30 and the coating material flow in cloud 20, is maintained relatively constant. The potential across resistor 28 may vary according to some other control algorithm, for example, increasing and decreasing according to surface features of the article 22 and/or maintaining the magnitude of the output high potential less than or equal to a maximum magnitude, within the overall strategy of relatively constant output current through terminal 30. This provides a relatively constant dispensing rate of coating material into the cloud 20 and thereby results in the relatively even flow of coating material to the article 22. This results in better finish quality on the article 22.

In the detailed descriptions that follow, several integrated circuits and other components are identified, with particular circuit types and sources. In many cases, terminal names and pin numbers for these specifically identified circuit types and sources are noted. This should not be interpreted to mean that the identified circuits are the only circuits available from the same, or any other, sources that will perform the described functions. Other circuits are typically available from the same, and other, sources which will perform the described functions. The terminal names and pin numbers of such other circuits may or may not be the same as those indicated for the specific circuits identified in this application.

Turning now to FIGS. 2–4, the system includes a μP 40, a display 100 and a high speed network I/O 102, such as a standard Control Area Network BUS (CANBUS) I/O. μP 40 illustratively is a type 80C196KB-12 μP. The μP 40 A/D converts several inputs, including: a commanded high-magnitude output voltage (KV) setting, KVCOM, from a system 10 control panel; the commanded high magnitude potential supply output current limit, Current Limit COMmand, from the control panel; the Kilo Volt FeedBack signal from the output of the high magnitude potential supply; the ground return current feedback, IFB, at the high magnitude potential supply's ground return connection; and, the magnitude of a center tap voltage, VCT, to a primary winding of the high magnitude potential supply's high voltage transformer. The μP 40 generates from these inputs and others outputs including: a Phase Lock ENable signal to enable the high magnitude potential supply's phase locked loop oscillator 112, FIG. 3; a Corona SSeNSe signal to the VCT regulator 86; an Air Trigger control to trigger the flow of, for example, atomizing or shaping air to a pneumatically assisted atomizer 113 (FIG. 5*p*), such as an automatic gun-type atomizer, or a rotary atomizer such as a bell- or disk-type atomizer (an illustrative rotary atomizer being an ITW Ransburg powder bell); a Fluid Trigger control to trigger the flow of, for example, coating material or solvent during a coating operation or color change, respectively; KV Set, which will be either KVCOM in the local control mode or the output high magnitude voltage setting commanded by a Programmable Logic Controller (PLC) 91 in the remote control mode; I Set which will be either CLCOM in the local control mode or the current setting commanded by PLC 91 in the remote control mode; and, the HV ON signal which switches on the high magnitude potential supply 106 to the atomizing device 113.

The output circuit, FIG. 3, includes: a buffer amplifier 114 which receives the IFB signal and outputs the buffered IFB signal to the μP 40 and to an analog slope control circuit 116; and, buffer amplifier 88 which receives the KVFB signal and outputs the buffered KVFB signal to the μP 40, to the analog slope control circuit 116, and to one throw 118*a* of a single pole, double throw primary/secondary feedback select switch 118. The pole 118*b* of the switch 118 is coupled through a scaling amplifier 120 to the FeedBack terminal of the VCT regulator 86. The output circuit also includes a KV Set input to the VCT regulator 86. The output terminal of the VCT regulator 86 is coupled through a buffer 122 to the center tap 108 of the primary winding 133*a* of the high magnitude potential transformer 133, FIG. 5*p*. This terminal is also coupled through a scaling amplifier 124 to the remaining throw 118*c* of feedback select switch 118. Thus, the operator has the ability to select 118*b* the source of the voltage feedback signal to the voltage feedback input terminal of the VCT regulator 86 the operator can select either the VCT input voltage, appropriately scaled by amplifier 124 appearing at terminal 118*c*, or the high magnitude potential supply's output voltage, KVFB appearing at terminal 118*a*. The output circuit also includes the VCT shutdown switch 84 which disables the VCT regulator 86 by switching the COMPensating input terminal of the VCT regulator 86 in response to the CoRona SeNSe signal from the μP 40. The output circuit also includes a phase locked loop high magnitude potential supply oscillator 112, with its Phase Lock ENable and Phase Lock FeedBack inputs and its amplified 132, 134 outputs A and B to the two ends of the high magnitude potential supply's input transformer 133 primary winding 133*a*.

Pulses having pulsewidths and frequencies determined in a manner which will be described are supplied to the VCT shutdown switch 84. The output from the VCT shutdown switch 84 is an input to the VCT regulator IC 86. Other inputs to the VCT regulator IC 86 include the KVFB signal buffered by the KVFB buffer 88, and a commanded KV setting. Commanded KV COM may come from either of two sources, a KV adjust potentiometer 90 on the front panel of the apparatus or from PLC 91 as one of the I/O functions 89. See also FIG. 7. To select KV adjust from among the I/O functions, the operator needs to select the remote position of a local/remote switch 96 on the front panel.

Turning now to FIGS. 5*a*–*p*, the partly block and partly schematic diagrams of a circuit realization of the illustrated system, signals and operating potentials are coupled to and from the system's internal bus 140, FIGS. 5*a*–*c*. μP 40 includes an A/D port 0, FIG. 5*d*, which receives from bus 140 the VCT, IFB, KVCOM, PulseWidth Modulation CONTrol, BUFFered IFB, CLCOM, and BUFFered KVFB signals from the bus 140. These signals are applied through input circuitry including 270 Ω–0.01 μF RC circuits and back-to-back diode protection circuits to the P0.7–P0.1 terminals, respectively, of port 0. Display 100 is driven by a display driver 142, FIG. 5*e*, coupled between port 1 of μP 40 and display 100. Specifically, the P1.0–P1.5 terminals of μP 40 are coupled to the I D0–1 D3, MODE, and Write terminals, respectively, of display driver 142. Display driver 142 illustratively is a type I CM7218A1 J1 display driver.

The program executed by μP 40 is stored in an EPROM 144, FIGS. 5*f*–*g*. A static RAM 146 provides storage for the calculations made by μP 40, as well as for data passed back and forth to and from a bus 148, FIGS. 5*h*–*i*. EPROM 144 illustratively is a type 28F001BX EPROM. SRAM 146 illustratively is a type 43256 SRAM. The CANBUS I/O 102 includes a three-to-eight demultiplexer 150, FIG. 5*h*, whose outputs Q4–Q0 drive, among other things, the Corona SSeNSe A, Phase Lock ENable, FLuiD TRIGger, AIR TRIGger, and HVON A# lines, respectively, of the bus 148. Demultiplexer 150 illustratively is a type 74LS259 demultiplexer. The CANBUS I/O 102 also includes a serial-to-parallel/parallel-to-serial converter 154 and bus driver 156. The CAN+ and CAN− terminals of bus 148 are coupled to the BUS+ and BUS− terminals, respectively, of bus driver 156. The RX1 and RX0 terminals, respectively, of the S-P/P-S converter 154 are coupled to the REFerence and RX terminals, respectively, of the bus driver 156. The TX0 terminal of S-P/P-S converter 154 is coupled to the TX terminal of bus driver 156. S-P/P-S converter 154 illustratively is a type 82C200 S-P/P-S converter. The bus driver 156 illustratively is a type SI 9200 bus driver.

The I/O functions include provisions for an RS232 interface. Consequently, the I/O also includes an RS232-to-TTL/TTL-to-RS232 interface 160, FIG. 5i. The TXD and RXD lines, terminals P2.0 and P2.1, respectively, of μP 40 are coupled to the T2i and R2o terminals, respectively, of interface 160. The T2o and R2i terminals of interface 160 are coupled to the TX232 and RX232 lines, respectively, of the bus 148. Interface 160 illustratively is a type MAX232 interface.

Figure 5A:
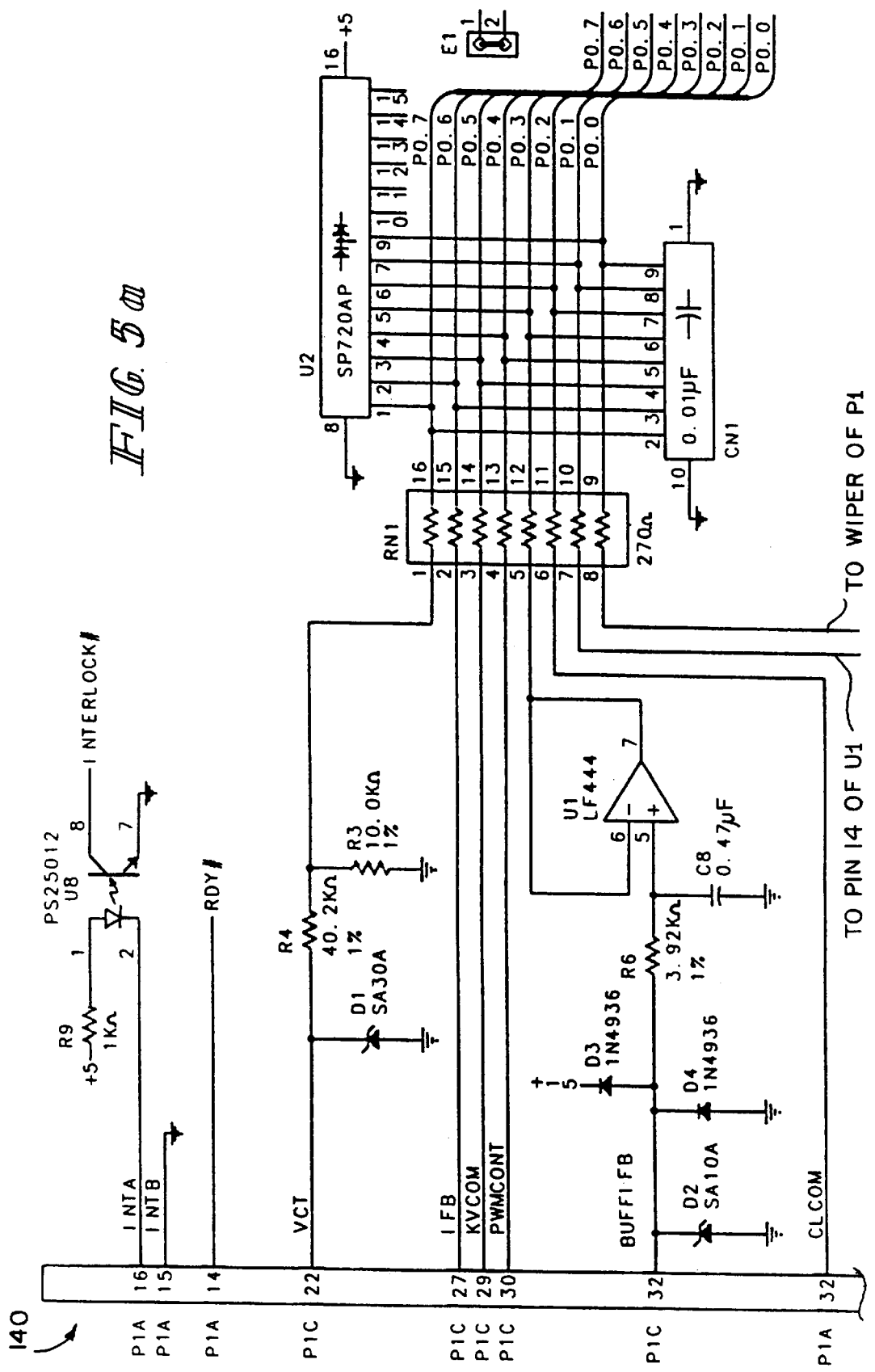
FIGS. 5a–p illustrate more detailed, partly block and partly schematic diagrams of the system illustrated in FIGS. 1–4; and, FIGS. 6–7 illustrate flow diagrams useful in understanding the system illustrated in FIGS. 1–4 and 5a–n.
Figure 5B:
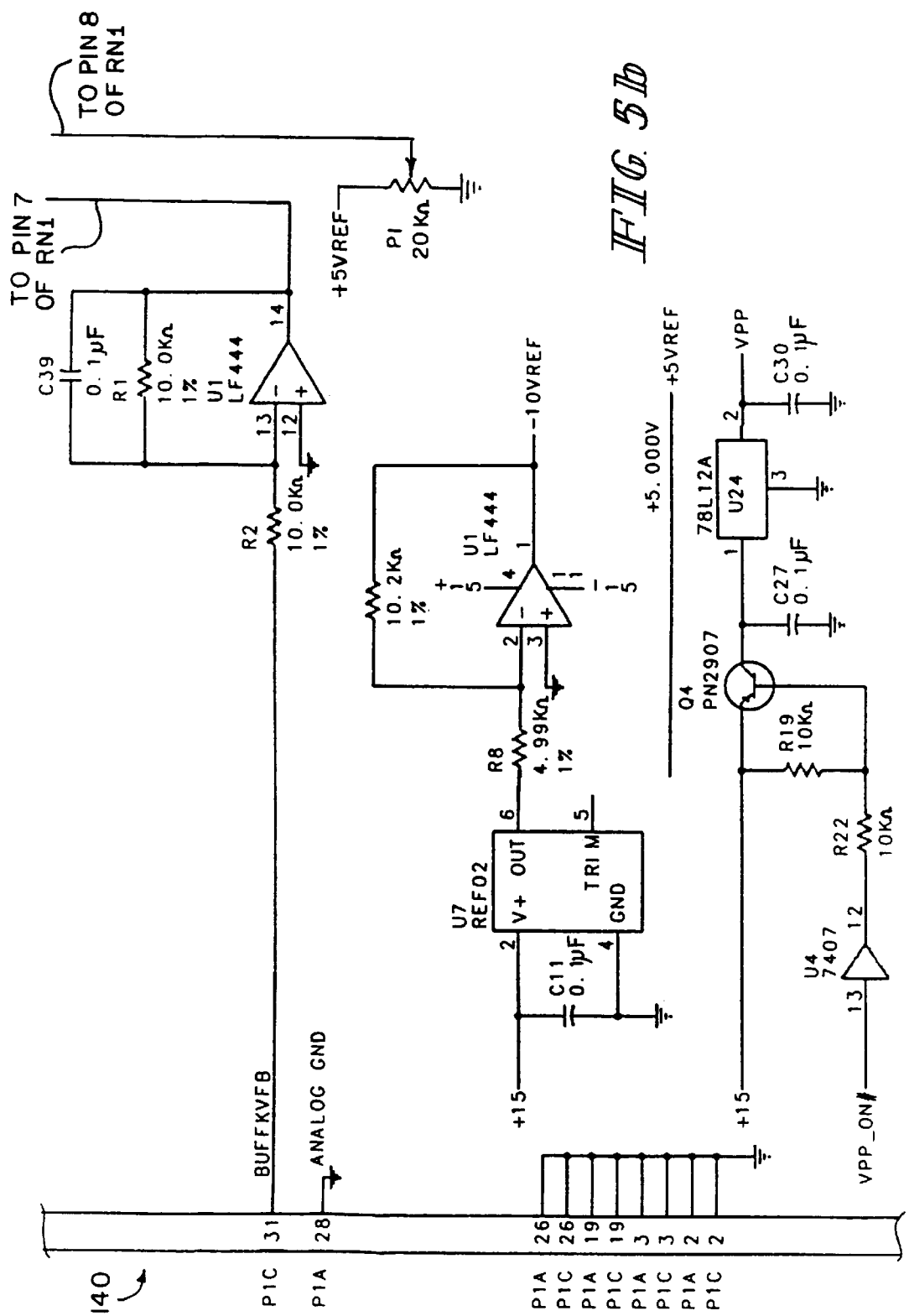
Figure 5C:
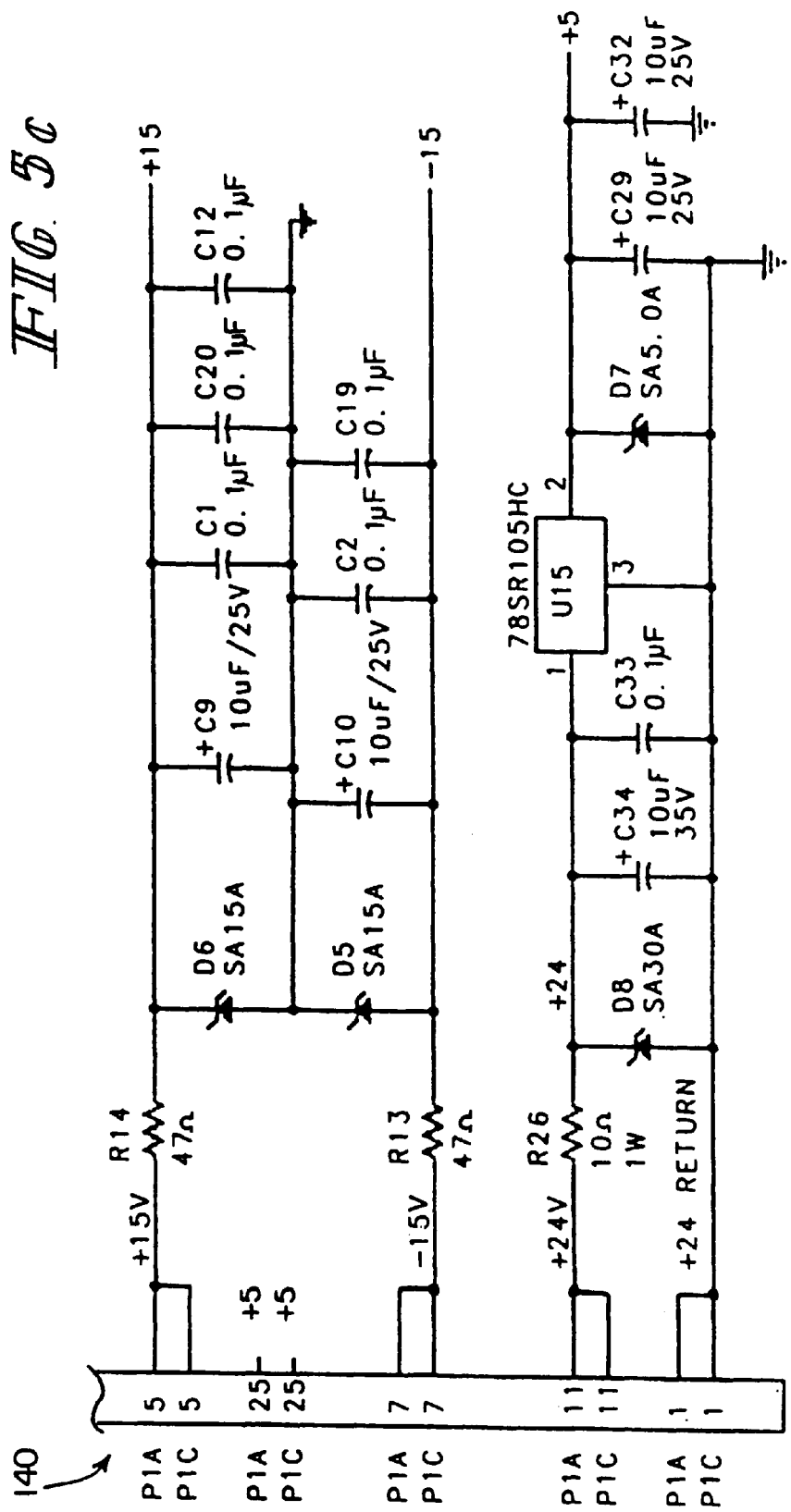
Figure 5D:
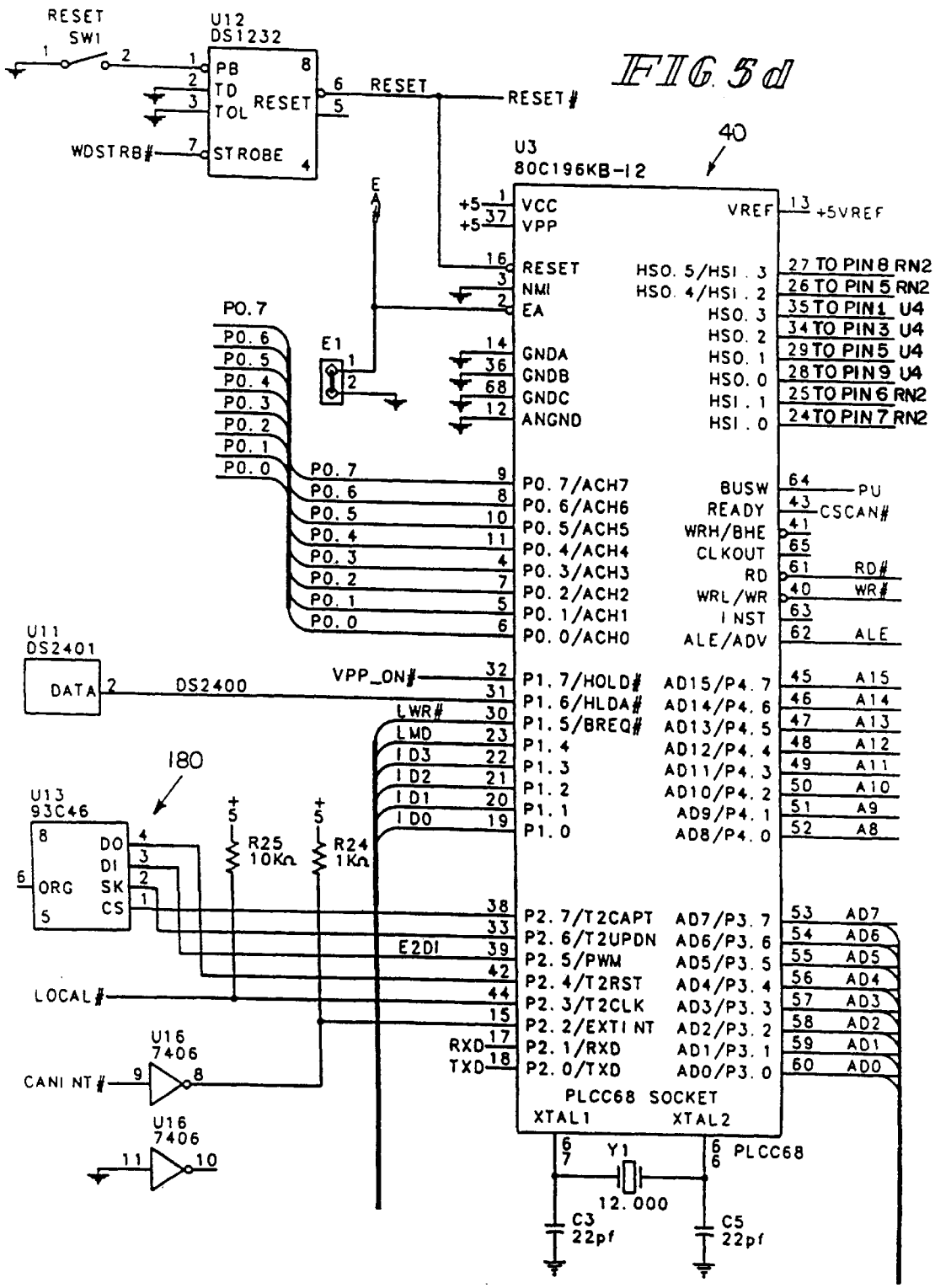
Figure 5F:
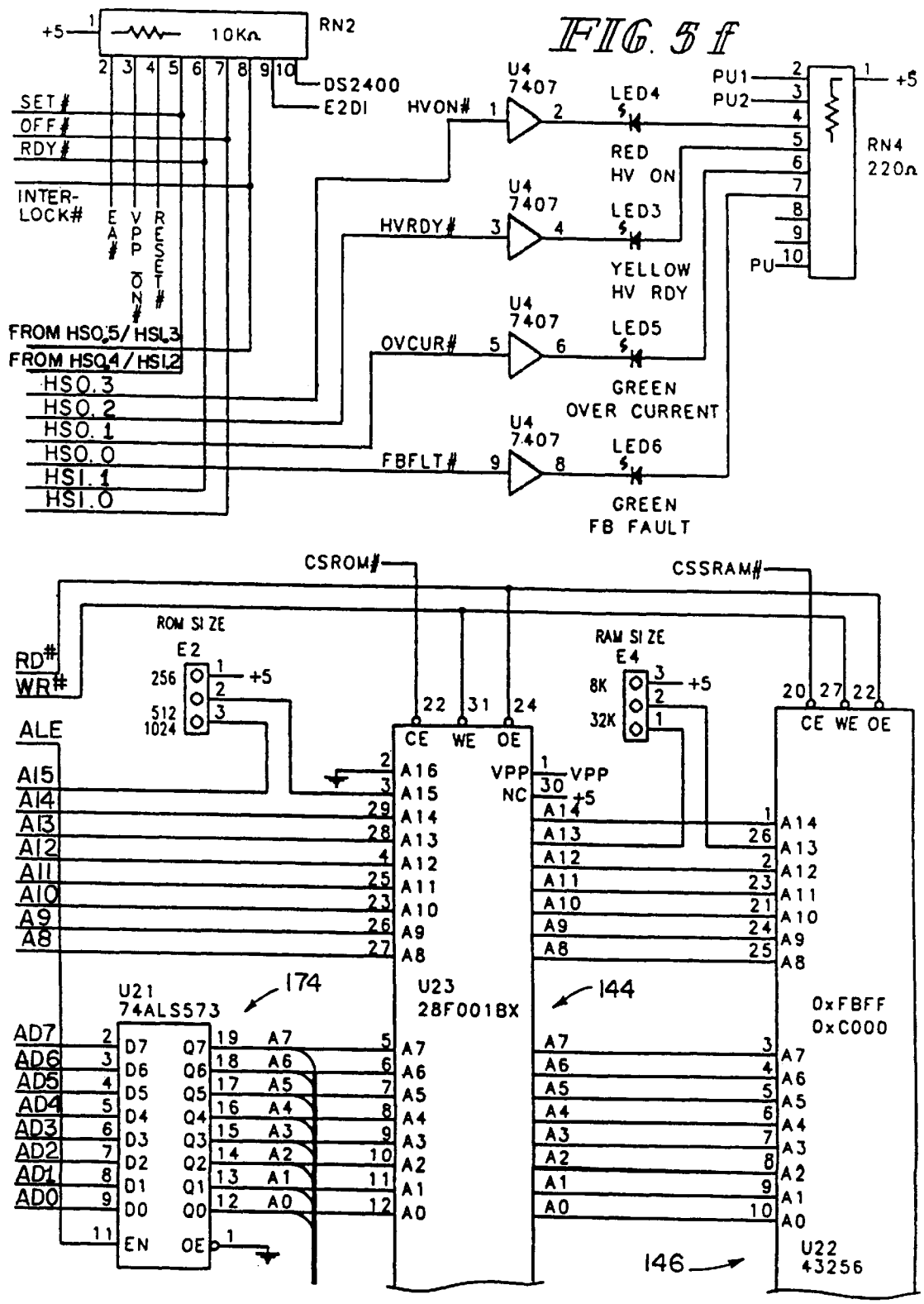
Figure 5G:
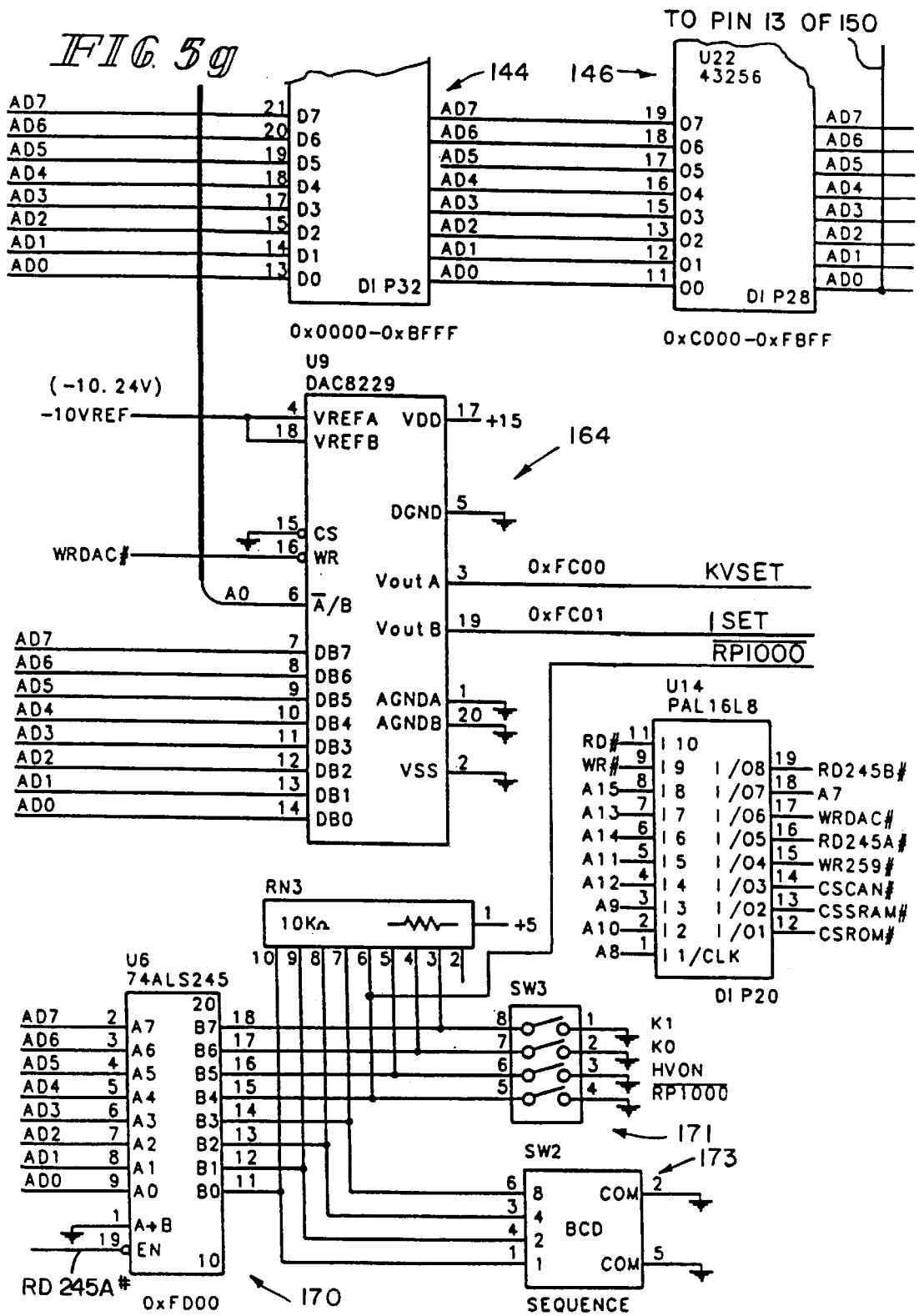
Figure 5H:
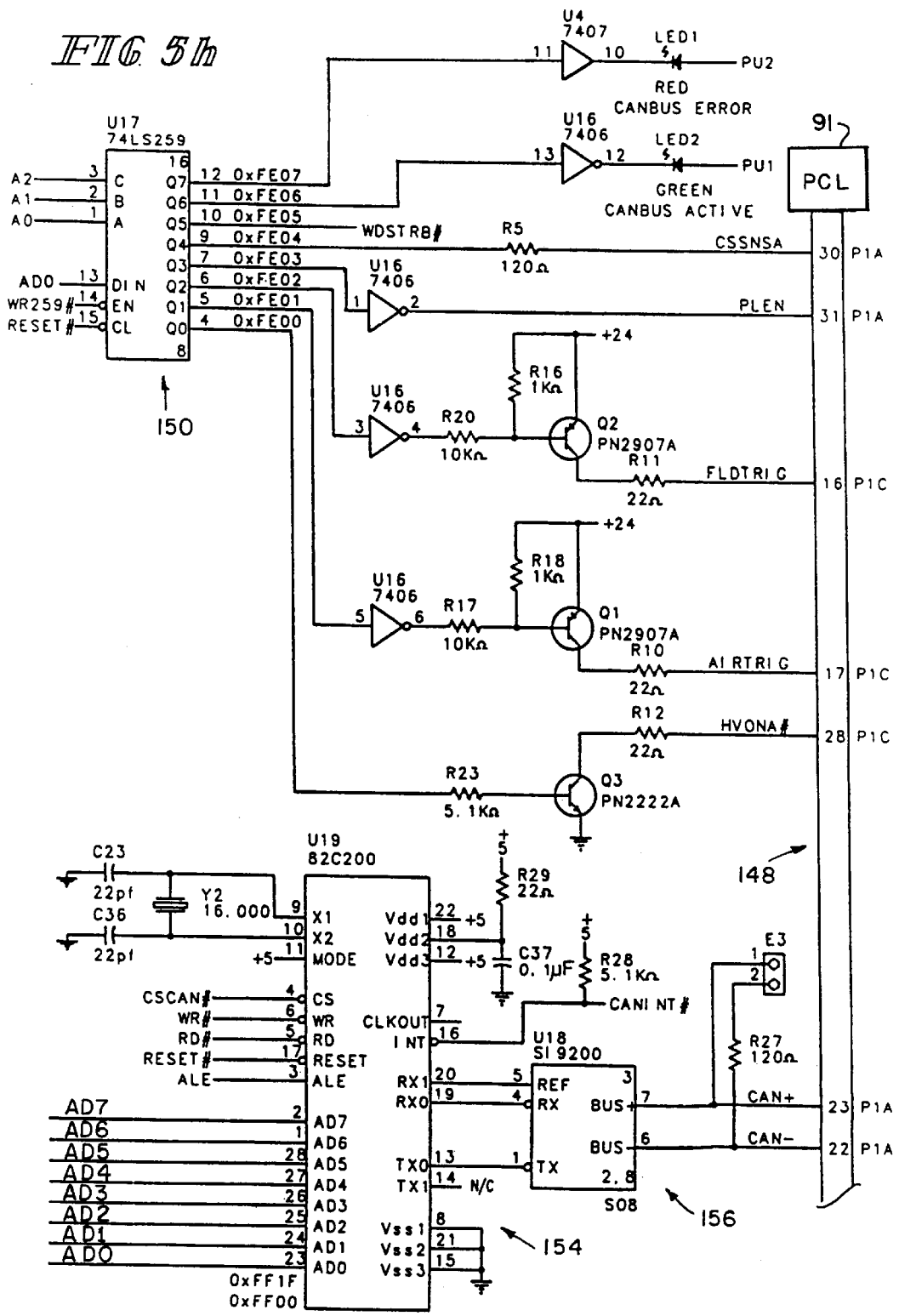
Figure 5I:
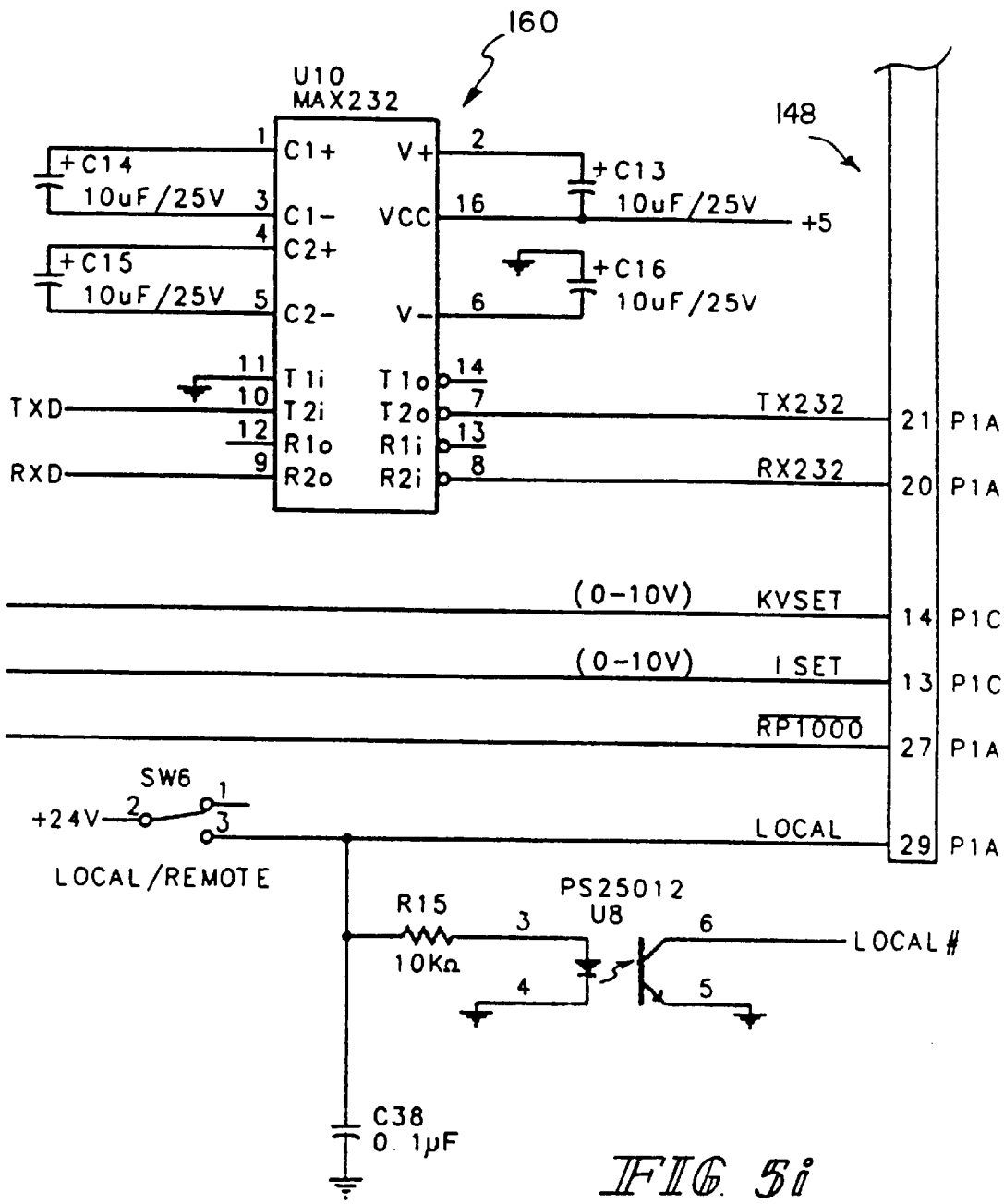
Figure 5J:
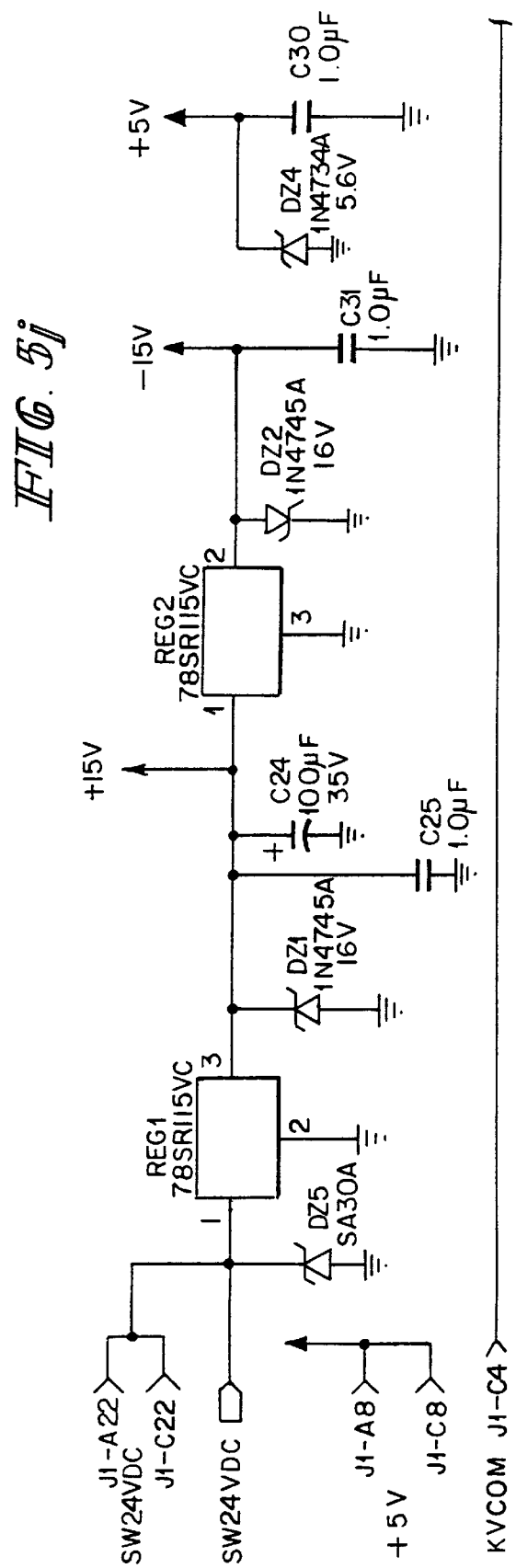
Figure 5E:
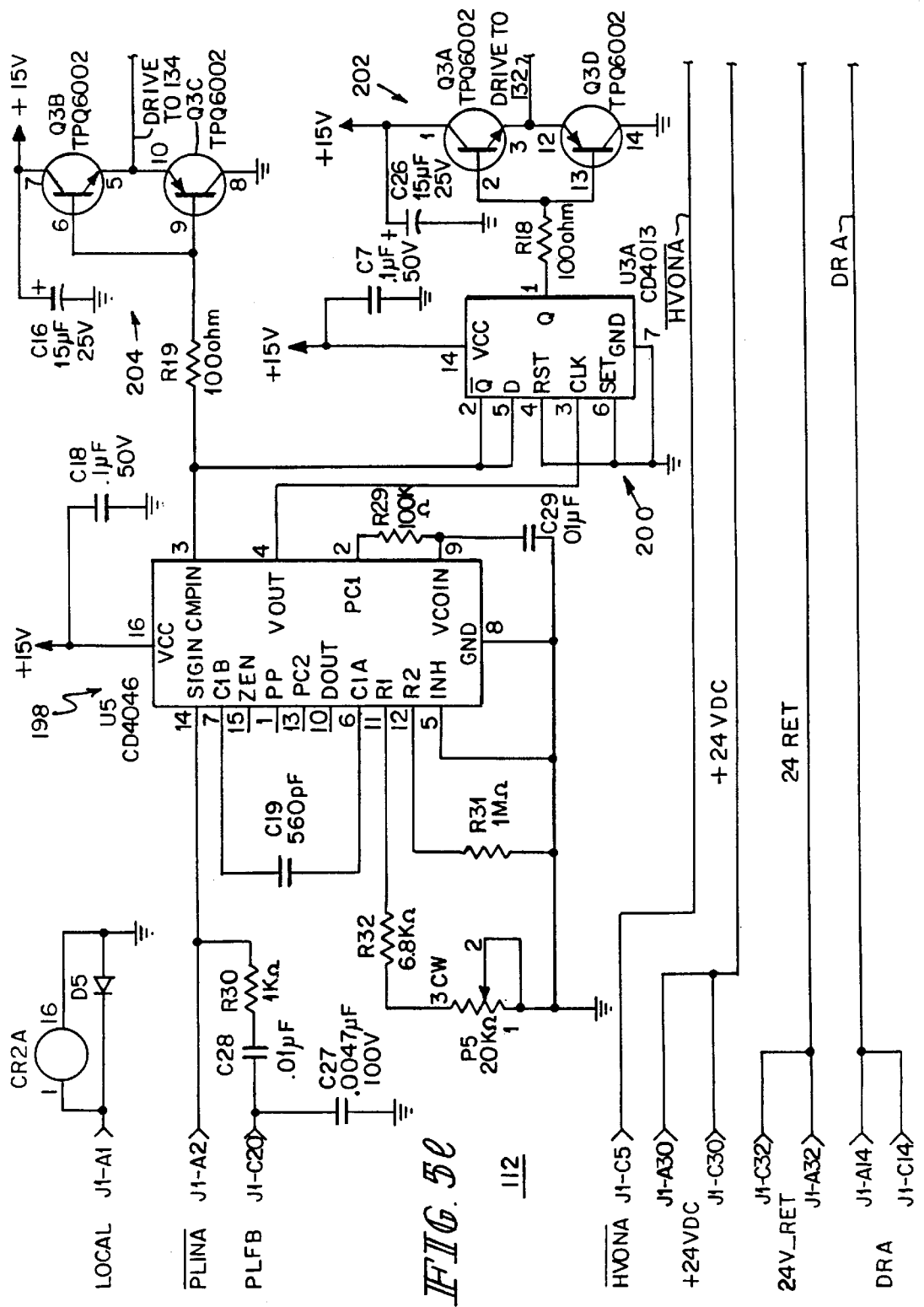

Analog signals to the output circuit, FIGS. 5j–p, are generated by a D/A converter 164, FIG. 5g, whose input port DB0–DB7 is coupled to the P3.0–P3.7 terminals, respectively, of μP 40 via the system AD0–AD7 lines, respectively. The Vout A and Vout B terminals of D/A converter 164 form the KVSET and I SET lines, respectively, of the bus 148. D/A converter 164 illustratively is a type DAC8229 D/A converter. The node address of μP 40 on the CANBUS is established by an octal switch 166, FIG. 5e, and 10 KΩ pull-down resistors coupled via an octal latch 168 to the system AD0–AD7 lines. Octal latch 168 illustratively is a type 74ALS245 octal latch. The system is designed to control a number of different types of power supplies, some using high-Q, high magnitude power supply input transformers 133 as taught in U.S. Pat. No. 5,159,544, and some using relatively lower-Q, high magnitude power supply input transformers 133. The system needs to be able to identify the type of power supply it is controlling. A line, notRP1000 identifies the power supply being controlled by the illustrated system as one having a high-Q input transformer 133 or not. This line of the bus 148 instructs one bit of input to μP 40 via one switch of a quad switch 171. Another switch of quad switch 171 is the system's manual HV On switch. Another quad switch 173 controls the system's initialization sequence. These switches are coupled via an octal latch 170 to the system AD0–AD7 lines. Latch 170 illustratively is a type 74ALS245 octal latch.

The AD0–AD7 lines are also coupled to the D0–D7 terminals, respectively, of EPROM 144, the O0–O7 terminals, respectively, of SRAM 146, and the AD0–AD7 terminals, respectively, of P-S/S-P converter 154. The AD0–AD7 lines are also coupled to the D0–D7 lines, respectively, of a buffer/latch 174, FIG. 5f. The output terminals Q0–Q7 of buffer/latch 174 are coupled to the system A0–A7 lines, respectively. Buffer/latch 174 illustratively is a type 74ALS573 buffer/latch. The system A0–A7 lines are coupled to the A0–A7 terminals of EPROM 144, respectively, and to the A0–A7 terminals of SRAM 146, respectively. The P4.0–P4.7 terminals of μP 40 are coupled via the system A8–A15 lines, respectively, to the A8–A15 terminals, respectively, of EPROM 144, and the A8–A14 lines are also coupled to the A8–A14 terminals of SRAM 146, respectively. High Voltage On, High Voltage ReaDY, OVerCURrent and FeedBack FauLT status is indicated to the operator by, among other things, LEDs coupled through appropriate amplifiers to respective ones of the HS0.3, HS0.2, HS0.1, and HS0.0 terminals of μP 40. An EEPROM 180, FIG. 5d, containing initializing parameters for the μP 40 has its DO, DI, SK and CS terminals, respectively, coupled to the μP 40's P2.4–P2.7 terminals. EEPROM 180 illustratively is a type 93C46 EEPROM. CANBUS ACTIVE and CANBUS ERROR status is indicated by, among other things, LEDs coupled through appropriate amplifiers, FIG. 5h, to the Q6 and Q7 terminals, respectively, of demultiplexer 150.

Referring now to FIGS. 5j–p, the output circuit includes a phase locked loop IC 198, FIG. 5l, and the A and B drive transistors 132, 134, FIG. 5o. The SIG IN input to the PLL IC 198 is the PhaseLock FeedBack signal shaped by an RC circuit including a 0.0047 μF capacitor to ground and the series combination of a 0.01 μF capacitor and a 1 KΩ resistor. The SIG IN input terminal of PLL IC 198 is also coupled to the not Phase Lock IN A signal line. PLL IC 198 illustratively is a type CD4046 PLL IC. Transistors 132, 134 illustratively are type IRF540 FETs. The drive signal for transistor 132 is output from the VOUT terminal of the PLL IC 198 to the CLocK input terminal of a D flip-flop 200. The oppositely phased Q and notQ outputs of D FF 200 are coupled to two push-pull configured predriver transistor pairs 202, 204, respectively, the outputs of which are coupled through respective wave-shaping parallel RC circuits 206 to the gates of the respective A and B drive transistors 132, 134. The drains of the respective A and B drive transistors 132, 134 are coupled to the opposite ends, the Drive A and Drive B terminals, respectively, of the primary winding 133a, FIG. 5p, of the input transformer 133 of the high magnitude potential supply. The sources of transistors 132, 134 are coupled to the system's +24 VDC ground RETurn. D FF 200 illustratively is a type CD4013 D FF. Transistor pairs 202, 204 illustratively are type TPQ6002 transistor pairs. The remainder of the PLL circuit is generally as described in U.S. Pat. No. 5,159,544.

Turning to FIG. 5k, the PC I SET signal, the current setting coming over to the system from the PLC 91, is coupled through a 100 KΩ input resistor to the non-inverting (+) input terminal of a difference amplifier 210. The + input terminal of amplifier 210 is coupled through a 49.9 KΩ resistor to ground. The Analog GrouND line of the system bus is coupled through a 100 KΩ input resistor to the inverting (−) input terminal of amplifier 210. The − input terminal of amplifier 210 is coupled through a 49.9 KΩ feedback resistor to its output terminal. The output terminal of amplifier 210 is coupled through a normally closed pair 212a of relay 212 contacts to a terminal 214. The normally open pair 212b of contacts of relay 212 is coupled across terminal 214 and the wiper of a 1 KΩ potentiometer 218. This arrangement permits the operator to select either PLC 91 control of the current setting of the system or front panel control of the current setting via potentiometer 218.

A similar configuration including an amplifier 220 permits the system operator to select either PLC 91 control or front panel control of the desired output high potential magnitude of the high magnitude potential supply. The PC KV SET signal line is coupled through a 100 KΩ input resistor to the + input terminal of amplifier 220. Series 49.9 KΩ resistors between +5 VDC supply and ground bias the + input terminal of amplifier 220 at +2.5 VDC. Analog GrouND is coupled through a 100 KΩ resistor to the − input terminal of amplifier 220. An RC parallel feedback circuit including a 25.2 KΩ resistor and a 0.01 μF capacitor is coupled across the − input terminal and the output terminal of amplifier 220. The output terminal of amplifier 220 is coupled through the normally closed terminals 222a of a relay 222 to the KV COMmanded line of the system bus. This signal is alternately selectable at the operator's option with a DC voltage established on the + input terminal of a buffer amplifier 224. This DC voltage is established on the wiper of a 1 KΩ potentiometer 226. Potentiometer 226 is in series with an 825 Ω resistor and a 500 Ω potentiometer between +5 VDC and ground. The wiper of the 500 Ω potentiometer is also coupled to ground so that the 825 Ω resistor and the setting of the 500 Ω potentiometer establish the minimum output high magnitude potential settable by the operator at the system front panel. The output of amplifier 224 is selectively coupled across the normally open terminals 222b of relay 222 to the KV COM line. Amplifiers 210, 220 and 224 illustratively are ¾ of a type LF444CN quad amplifier.

Figure 5M:
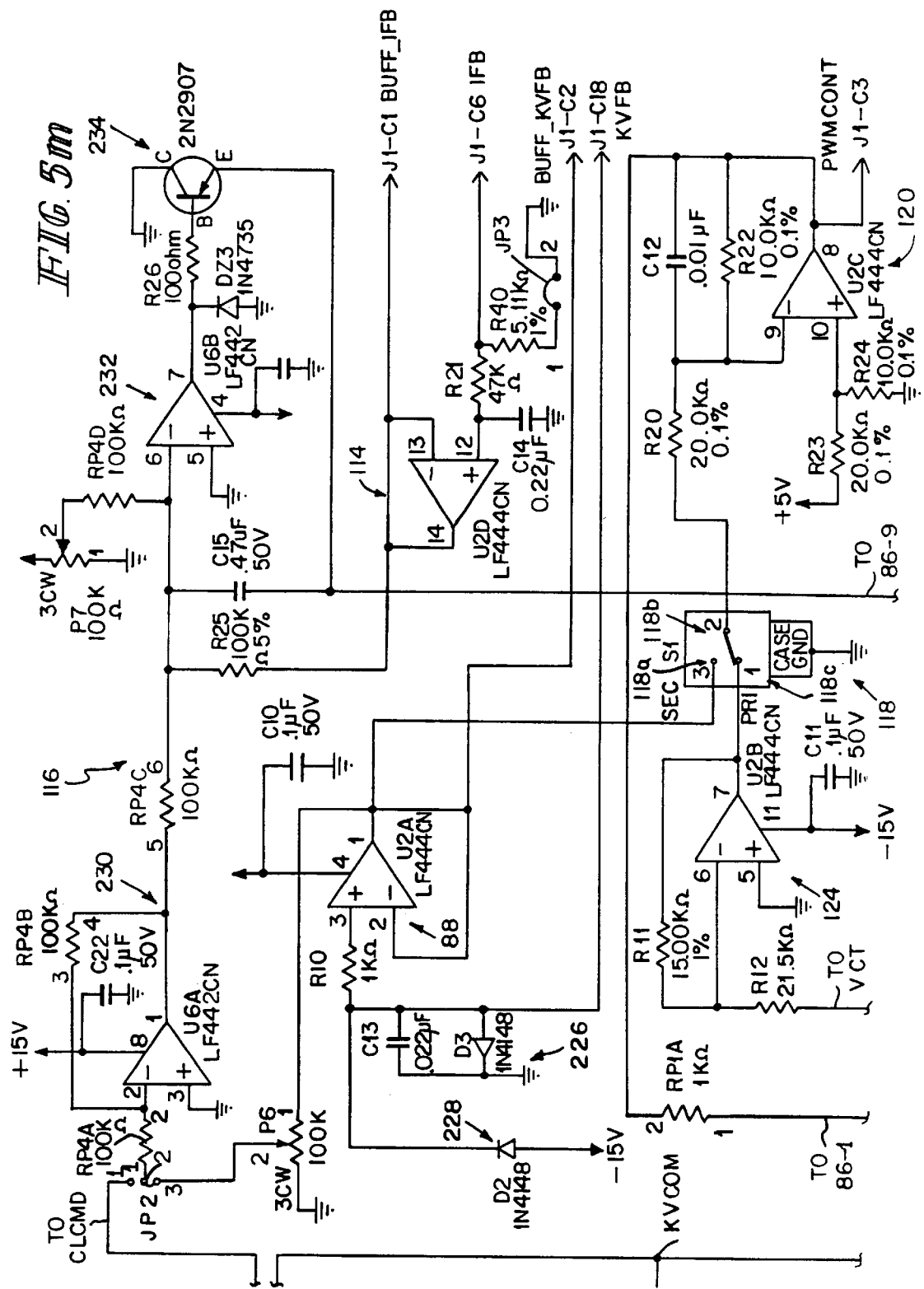

Referring now to FIG. 5m, the IFB signal from the system bus is coupled to the + input terminal of amplifier 114 via a 47 KΩ input resistor. A 0.22 μF capacitor is coupled between the + input terminal of amplifier 114 and ground. The output terminal of amplifier 114 is coupled to its − input terminal in buffer configuration, and forms the BUFFered IFB terminal which is coupled to the μP 40. The KVFB signal from the system bus is coupled to the + input terminal of amplifier 88 via a 1 KΩ input resistor. The + input terminal of amplifier 88 is clamped between +0.6 VDC and −15.6 VDC by diodes 226, 228 on its + input terminal. The output terminal of amplifier 88 is coupled to its − input terminal in buffer configuration, and forms the BUFFered KVFB terminal which is coupled to the μP 40. BUFFKVFB is also coupled to terminal 118a of PRImary/SECondary FeedBack switch 118. Terminal 118b of switch 118 is coupled to the − input terminal of scaling amplifier 120 via a 20 KΩ series resistor. The + input terminal of amplifier 120 is biased at +5/3 VDC by a series 20 KΩ–10 KΩ voltage divider. The output terminal of amplifier 120, which forms the Pulse-Width Modulator CONTrol line of the system bus, is coupled through a 1 KΩ series resistor to the control input terminal, pin 1, of a switching regulator IC VCT regulator 86. VCT appears across the I+ output terminal, pin 4, of IC 86 and ground. VCT is fed back through series 0.1 Ω, 3 W and 21.5 KΩ resistors to the − input terminal of scaling amplifier 124. The output terminal of amplifier 124 is coupled to its − input terminal through a 15 KΩ feedback resistor, and to terminal 118c of switch 118. Amplifiers 88, 114, 120 and 124 illustratively are a type LF444CN quad amplifier. VCT regulator IC 86 illustratively is a type UC3524A switching regulator.

The analog slope control circuit 116 includes a difference amplifier 230, a difference amplifier 232 and a transistor 234. The − input terminal of amplifier 230 receives the CurrentLimitCOMmand signal via a series 100 KΩ resistor from the system bus. A 100 KΩ feedback resistor is coupled between the output terminal and the − input terminal of amplifier 230. The output terminal of amplifier 230 is coupled through a 100 KΩ resistor to the − input terminal of amplifier 232. BUFFIFB is also coupled to the − input terminal of amplifier 232 through a 100 KΩ resistor. The − input terminal of amplifier 232 is biased negative via a 100 KΩ resistor to the wiper of a 100 KΩ potentiometer in series between −15 VDC and ground. The output terminal of amplifier 232 is coupled through a 100 Ω resistor to the base of transistor 234. The collector of transistor 234 is coupled to ground and its emitter is coupled to the COMPensate terminal of IC 86. Amplifiers 230, 232 illustratively are a type LF442CN dual amplifier. Transistor 234 illustratively is a type 2N2907 bipolar transistor.

Figure 5N:
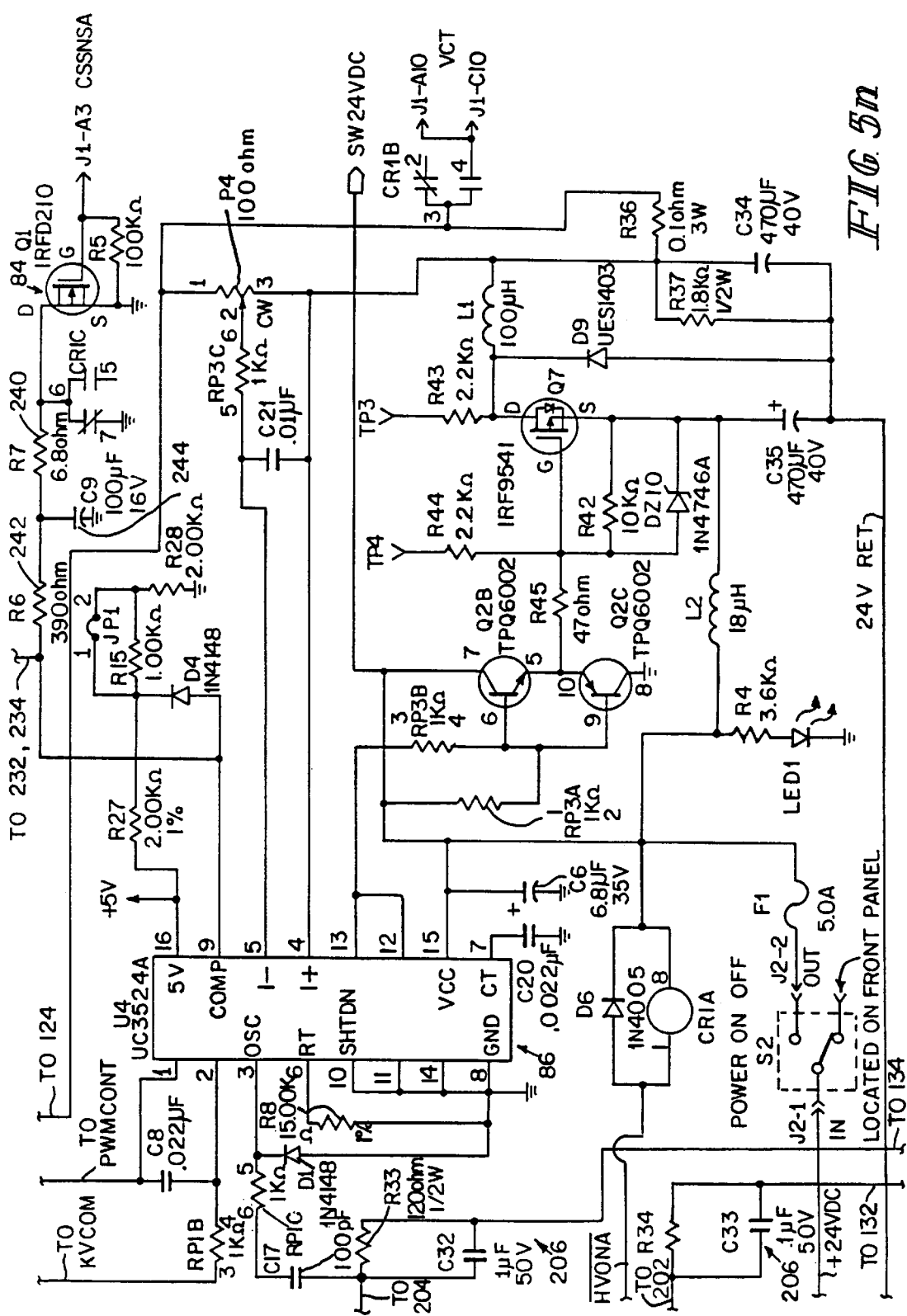
Figure 50:
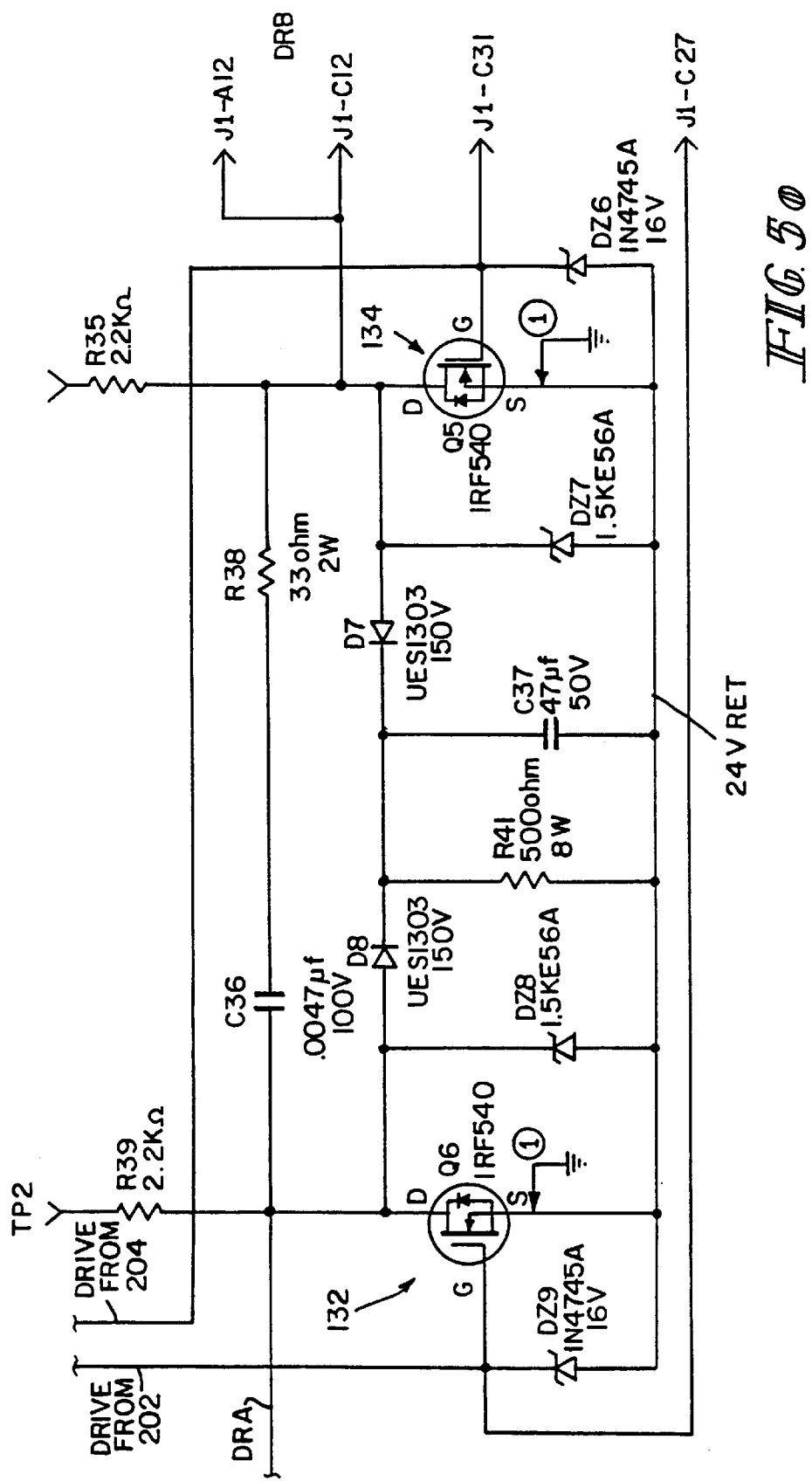
Figure 5P:
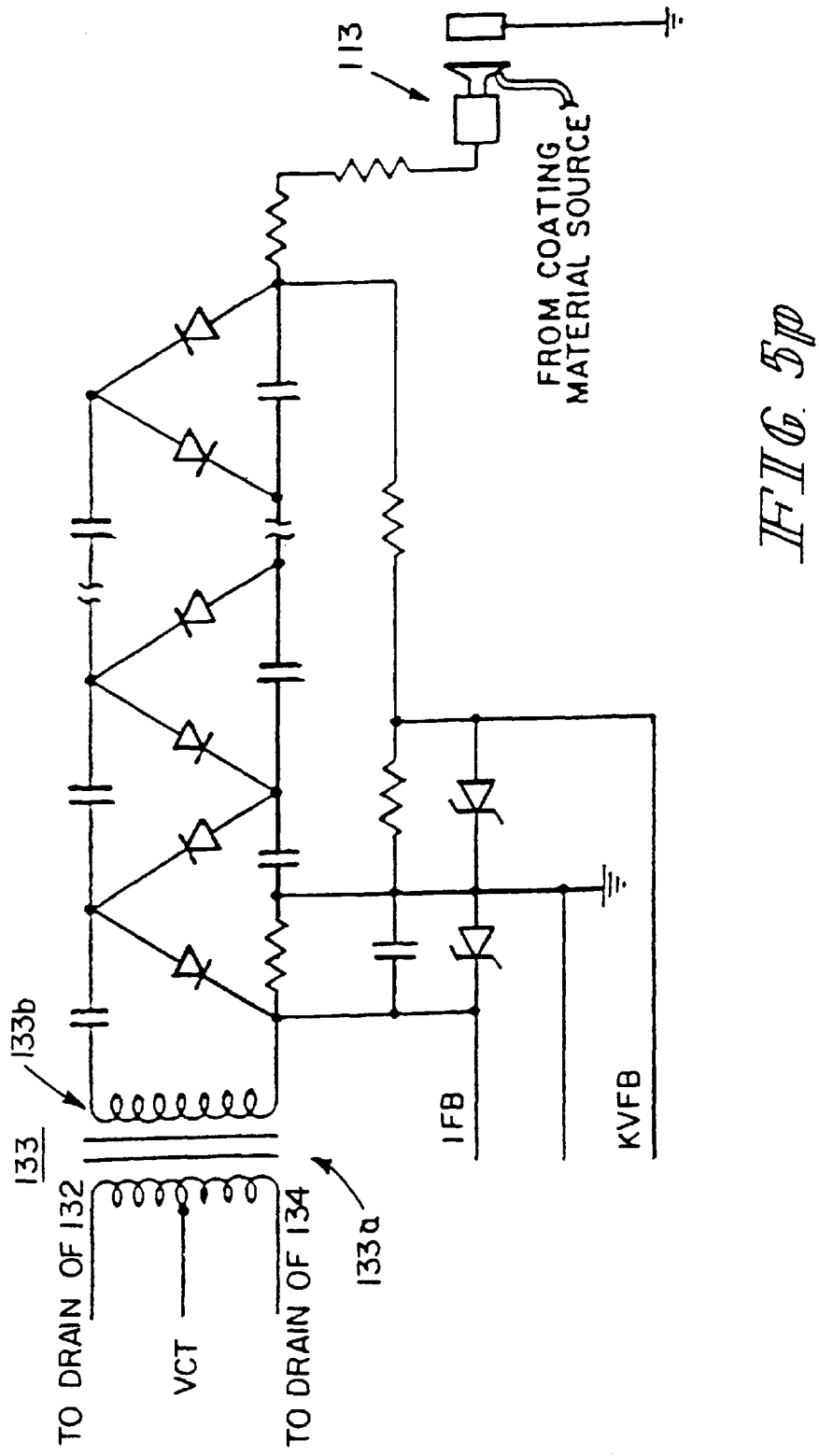

Referring to FIG. 5n, the system bus Corona SSeNSe A terminal is coupled to the gate of the VCT shutdown switch 84, and to ground through a 100 KΩ resistor. The drain of switch 84 is coupled through series 6.8 Ω and 390 Ω resistors 240, 242, respectively, to the COMP terminal of IC 86. A 100 μF smoothing capacitor 244 is coupled between the junction of these resistors and ground. The pulsewidth modulated output Corona SSeNSe A signal from μP 40 to the gate of switch 84 results in a DC voltage across capacitor 244. This voltage is summed at the COMP terminal of IC 86 with the output signal from the analog slope control circuit 116. This signal can be provided to the COMP terminal of IC 86 in other ways. For example, μP 40 has a D/A output port. The output signal on the μP 40's D/A output port provides an even smoother signal than the Corona SSeNSe A output signal filtered by the filter 240, 242, 244 to the COMP terminal of IC 86. Using the pulsewidth modulated Corona SSeNSe A output signal from μP 40, filtered by filter 240, 242, 244, or the D/A port of the μP 40, permits added flexibility in applications in which more than one dispensing device 113 is coupled to the system. For example, in a single applicator 113 situation, a delay of, for example, one-half second before the achievement of full high magnitude potential can be tolerated by the system. Where multiple applicators 113 are coupled to a common high magnitude potential supply, however, attempting to raise the high magnitude potential to its full commanded value too rapidly can result in charging current greater than the static overload current I SET. μP 40 gives the operator the flexibility to ramp the high magnitude potential up to full commanded value KV SET more slowly in these situations, resulting in fewer "nuisance" overcurrent conditions. Additionally, the slower ramping up to full commanded high voltage eases the stress on the high voltage cables which customarily couple the high magnitude supply to the coating dispensing devices 113. The OSCillator terminal of IC 86 is coupled through a series 1 KΩ resistor and 100 pF capacitor to the common emitters of transistor pair 204. Switch 84 illustratively is a type IRFD210 FET. IC 86 and its associated components function generally as described in U.S. Pat. No. 4,745,520.

Figure 6:
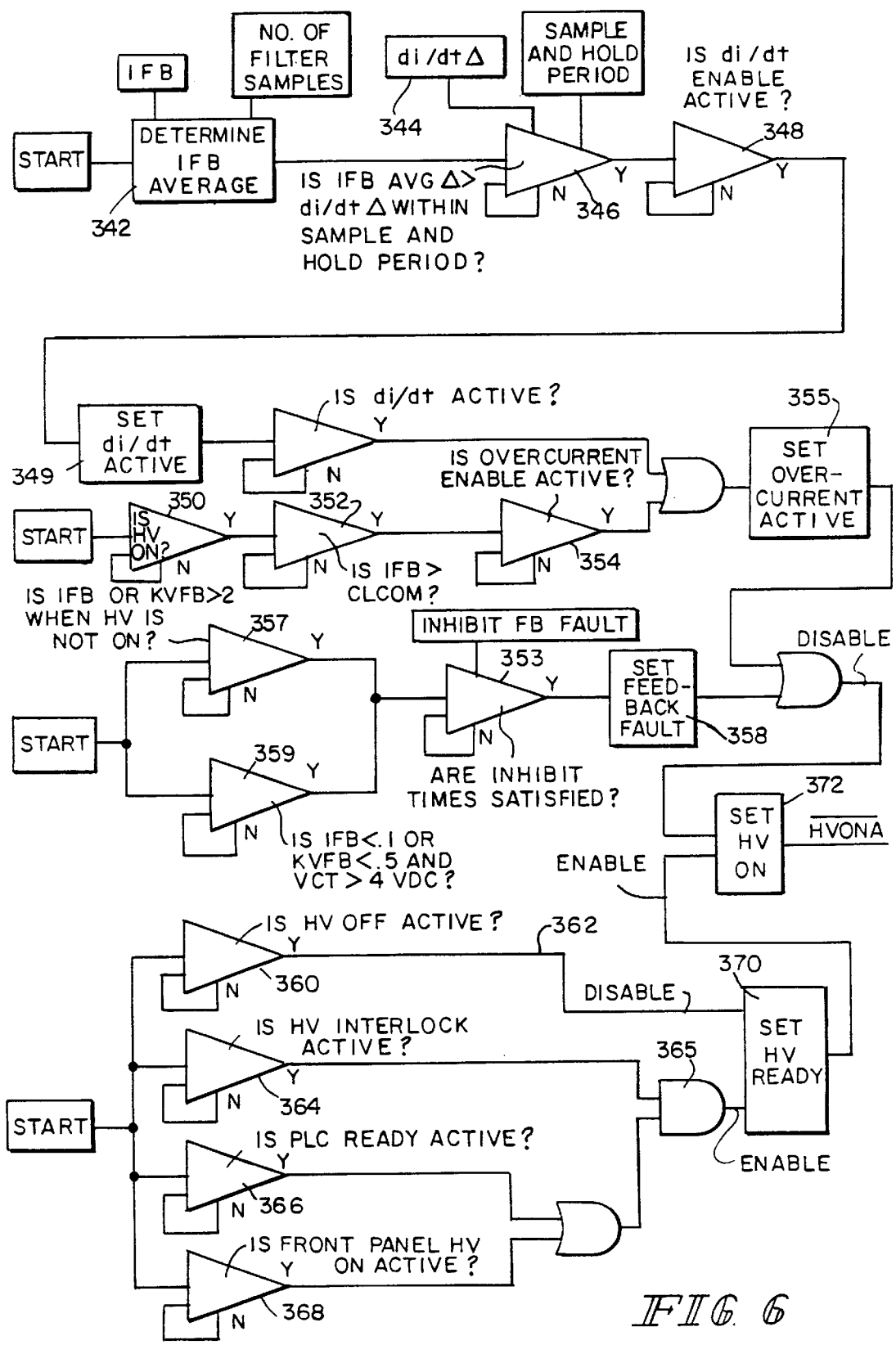
Figure 7:
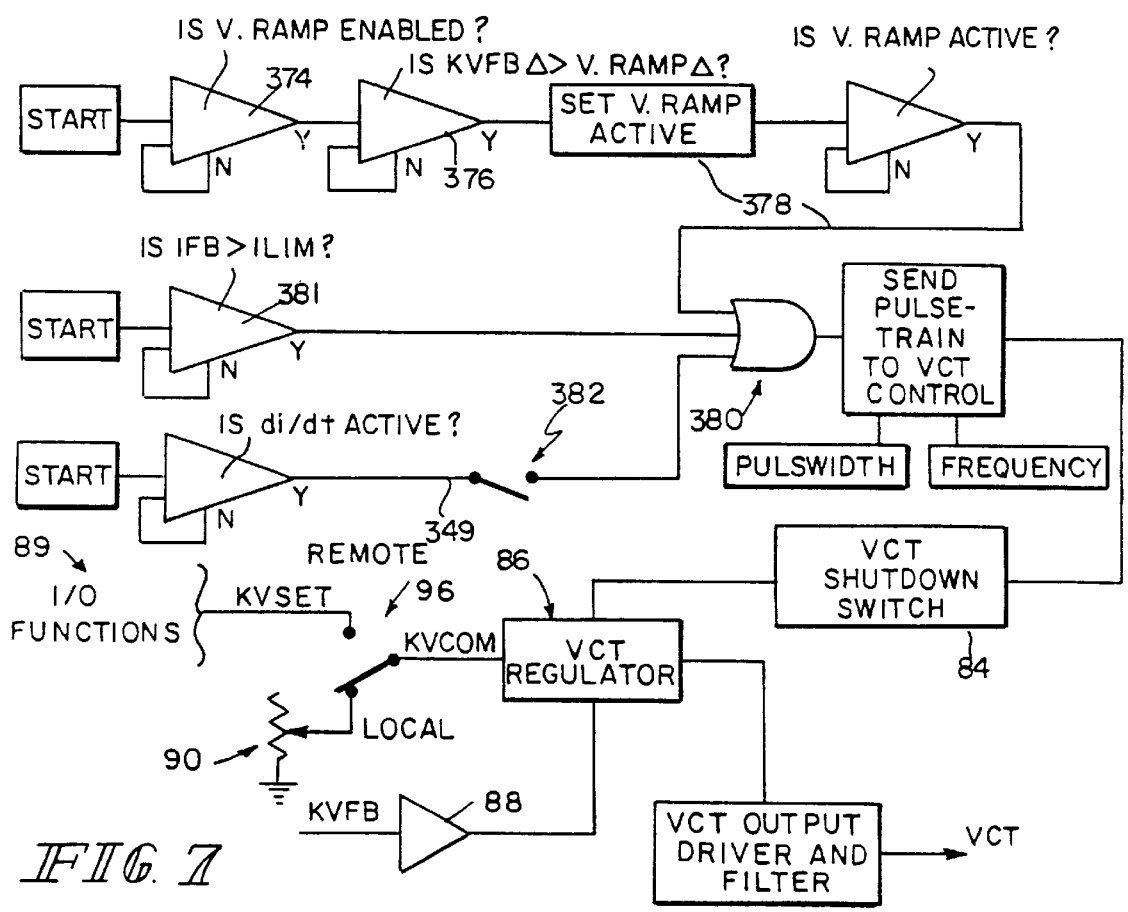

Flow diagrams of the routines which are executed by the μP 40 are illustrated in FIGS. 6–7. Referring particularly to FIG. 6, high voltage power supply ground return current feedback, IFB, and a number of filter samples are provided to a function 342 which calculates a current feedback average, IFB AVeraGe from these variables. A di/dtΔ setting is provided to the μP 40 from a display/set functions routine 344. di/dtΔ and the length of a sample and hold period are provided to a decision block 346 which determines whether the change in IFB average, IFB AVGΔ, over the sample and hold period is greater than di/dtΔ. This decision block 346 continues to be interrogated until IFB AVGΔ is greater than di/dtΔ over the sample and hold period. Once this result is achieved, the routine next determines 348 if di/dt enable is active. This decision block 348 continues to be interrogated until di/dt enable is detected active. Once this decision 348 is achieved, di/dt is set active at 349.

Another routine includes a decision block 350, "is High Voltage on?" This decision block 350 continues to be interrogated until HV is detected on. Once HV on is detected, a decision block 352 is reached, "is IFB greater than Current Limit COMmand?" Decision block 352 continues to be interrogated until IFB greater than CLCOM is detected. A decision block 354 is then reached, "is overcurrent enable active?" Decision block 354 continues to be interrogated until overcurrent enable is detected active. Once either di/dt or overcurrent enable is achieved, overcurrent is set active at 355.

Another decision that will disable HV On will now be explained. There are certain occurrences in the feedback paths for output high voltage and ground return current to the high voltage supply that the system interprets as feedback faults. If any of these faults occurs, the system is disabled by the μP 40. In the illustrated system, if IFB is greater than 2 μA or KVFB is greater than 2 KV, 357, after a preselected INHIBIT time interval 353 after initialization of the system, the μP 40 interprets 358 this occurrence as a feedback fault and disables the system. This corresponds to the situation of an output with no input. Similarly, if IFB is less than 0.1 μA or KVFB is less than 0.5 KV and VCT is greater than 4 volts DC, 359, after the passage of the INHIBIT interval, the μP 40 interprets 358 this occurrence as a feedback fault and disables the system. This corresponds to the situation of an input with no output.

Assuming that HV On is not disabled by either of these routines, the μP 40 determines 360 if HV Off is active. This decision block 360 continues to be interrogated until HV Off is detected active. Once HV Off is detected active, Set HV On is disabled at 362. If HV On is not disabled along one of these paths, the μP 40 next determines 364 if the system's Interlock is active. This decision block 364 continues to be interrogated until the interlock is detected active. The interlock active decision 364 gates 365 either the "Is Programmable Logic Controller Ready Active?" decision 366 or the "Is Front Panel HV On Active?" decision 368. Gating of either of these decisions 366, 368 by "Is Interlock Active?" 364 results 370 in the Setting of HV Ready. This results 372 in the Setting of HV On unless Set HV On has been disabled by Set Overcurrent Active 355 or Set FeedBack Fault 358.

Turning now to the regulation of the Voltage at the Center Tap, and with reference to FIG. 7, the μP 40 first determines 374 if the function Voltage Ramp is enabled. This decision block 374 continues to be interrogated until V.Ramp is enabled. Once V.Ramp is enabled, the μP 40 next determines 376 if KVFBΔ is greater than V.RampΔ. This decision block 376 continues to be interrogated until KVFBΔ is greater than V.RampΔ. Once this decision is detected, V.Ramp is set active at 378. This is one way that pulses can be furnished to the V Center Tap controller 380.

Pulses will also be sent to VCT controller 380 if the feedback current IFB is greater than the feedback current limit, I LIMit. This decision block is illustrated at 381. A third way in which pulses will be sent to the VCT controller 380 is if di/dt is active. This decision is illustrated at 349. This state is detected as described above in connection with the discussion of FIG. 6. In the illustrated embodiment, this method may or may not be employed at the option 382 of the operator.

A source code listing of the program executed by μP 40 is attached hereto as Exhibit A.

What is claimed is:

1. A high magnitude potential supply comprising a first circuit for generating a first signal related to an output high magnitude potential across a pair of output terminals of the supply, a second circuit for generating a second signal related to a desired output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal.

2. The apparatus of claim 1 wherein the first circuit comprises a programmable logic controller (PLC), and a high speed bus for coupling the PLC to the fourth circuit.

3. The apparatus of claim 2 wherein the first circuit comprises a first potentiometer for selecting a desired output high magnitude potential, and a conductor for coupling the first potentiometer to the fourth circuit.

4. The apparatus of claim 3 further comprising a switch for selectively coupling one of the PLC and the first potentiometer to the fourth circuit.

5. The apparatus of claim 4 wherein the second circuit comprises a second potentiometer for selecting a desired output current, and a conductor for coupling the second potentiometer to the fourth circuit.

6. The apparatus of claim 5 further comprising a second switch for selectively coupling one of the PLC and the second potentiometer to the fourth circuit.

7. The apparatus of claim 6 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

8. The apparatus of claim 7 wherein the fourth circuit comprises a switching regulator having an input terminal forming a summing junction for the first signal and the second signal and an output terminal coupled to the center tap, the fifth circuit including a microprocessor (μP) and a third switch coupled to the μP to receive a third switching signal from the μP, the third switch coupled to the summing junction to couple the third switching signal to the switching regulator to disable the supply of operating potential to the center tap.

9. The apparatus of claim 4 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

10. The apparatus of claim 9 wherein the fourth circuit comprises a switching regulator having an input terminal forming a summing junction for the first signal and the second signal and an output terminal coupled to the center tap, the fifth circuit including a microprocessor (μP) and a third switch coupled to the μP to receive a third switching signal from the μP, the third switch coupled to the summing junction to couple the third switching signal to the switching regulator to disable the supply of operating potential to the center tap.

11. The apparatus of claim 1 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

12. The apparatus of claim 11 wherein the fourth circuit comprises a switching regulator having an input terminal forming a summing junction for the first signal and the second signal and an output terminal coupled to the center tap, the fifth circuit including a microprocessor (μP) and a third switch coupled to the μP to receive a third switching signal from the μP, the third switch coupled to the summing junction to couple the third switching signal to the switching regulator to disable the supply of operating potential to the center tap.

13. The apparatus of claim 12 wherein the third switch is coupled to the summing junction through a filter which smooths the switching signals generated by the third switch in response to the μP's control.

14. The apparatus of claim 12 and further comprising a sixth circuit cooperating with the μP to determine if operating potential is being supplied to the high magnitude potential supply, and a seventh circuit cooperating with the μP to determine if the high magnitude potential supply is indicating that it is generating high magnitude potential, the μP indicating a fault if the operating potential is not being supplied to the high magnitude potential supply and the high magnitude potential supply is indicating that it is generating high magnitude potential.

15. The apparatus of claim 14 wherein the μP indicates a fault if the operating potential is being supplied to the high magnitude potential supply and the high magnitude potential supply is indicating that it is not generating high magnitude potential.

16. The apparatus of claim 12 and further comprising a sixth circuit cooperating with the μP to determine if operating potential is being supplied to the high magnitude potential supply, and a seventh circuit cooperating with the μP to determine if the high magnitude potential supply is indicating that it is generating high magnitude potential, the μP indicating a fault if the operating potential is being supplied to the high magnitude potential supply and the high magnitude potential supply is indicating that it is not generating high magnitude potential.

17. The apparatus of claim 1 wherein the first circuit comprises a first potentiometer for selecting a desired output high magnitude potential, and a conductor for coupling the first potentiometer to the fourth circuit.

18. The apparatus of claim 1 wherein the second circuit comprises a programmable logic controller (PLC), and a high speed bus for coupling the PLC to the fourth circuit.

19. The apparatus of claim 18 wherein the second circuit comprises a first potentiometer for selecting a desired output current, and a conductor for coupling the first potentiometer to the fourth circuit.

20. The apparatus of claim 19 further comprising a first switch for selectively coupling one of the PLC and the first potentiometer to the fourth circuit.

21. The apparatus of claim 20 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

22. The apparatus of claim 21 wherein the fourth circuit comprises a switching regulator having an input terminal forming a summing junction for the first signal and the second signal and an output terminal coupled to the center tap, the fifth circuit including a microprocessor (μP) and a third switch coupled to the μP to receive a third switching signal from the μP, the third switch coupled to the summing junction to couple the third switching signal to the switching regulator to disable the supply of operating potential to the center tap.

23. The apparatus of claim 1, 2, 3, 4, 17, 18, 19, 20, 5, 6, 11, 12, 13, 9, 10, 21, 22, 7, 8, 14, 15 or 16 further comprising a supply of coating material and a device for dispensing the coating material, the coating material dispensing device being coupled to the supply of coating material and to the high magnitude potential supply to charge the coating material dispensed by the coating material dispensing device.

* * * * *